(12) United States Patent
Williams et al.

(10) Patent No.: US 11,551,274 B2
(45) Date of Patent: Jan. 10, 2023

(54) SCALABLE SYSTEMS AND METHODS TO TRANSFER CONTROL OF VIRTUAL OBJECTS OF A VIRTUAL WORLD IMPLEMENTED ON MULTIPLE HOSTS

(71) Applicant: Linden Research, Inc., San Francisco, CA (US)

(72) Inventors: Ryan D. Williams, San Francisco, CA (US); Aaron G. Brashears, San Francisco, CA (US)

(73) Assignee: Linden Research, Inc., San Francisco, CA (US)

( * ) Notice: Subject to any disclaimer, the term of this patent is extended or adjusted under 35 U.S.C. 154(b) by 801 days.

(21) Appl. No.: 15/641,685

(22) Filed: Jul. 5, 2017

(65) Prior Publication Data
US 2017/0300987 A1 Oct. 19, 2017

Related U.S. Application Data

(60) Continuation of application No. 13/238,458, filed on Sep. 21, 2011, now abandoned, which is a division of
(Continued)

(51) Int. Cl.
*G06Q 30/06* (2012.01)
*G06Q 20/06* (2012.01)
(Continued)

(52) U.S. Cl.
CPC ......... *G06Q 30/0603* (2013.01); *G06Q 20/06* (2013.01); *G06Q 20/3572* (2013.01);
(Continued)

(58) Field of Classification Search
USPC .................................................. 705/50–79
See application file for complete search history.

(56) References Cited

U.S. PATENT DOCUMENTS 5,261,089 A 11/1993 Coleman et al.
5,280,612 A 1/1994 Lorie et al.
(Continued)

OTHER PUBLICATIONS

"Virtual Worlds Research: Past, Present & Future", downloaded from https://journals.tdl.org/jvwr/index.php/jvwr/article/view/278/234 dated 2008 and attached as a PDF file. (Year: 2008).*
(Continued)

*Primary Examiner* — James D Nigh
*Assistant Examiner* — Margaret M Neubig
(74) *Attorney, Agent, or Firm* — Greenberg Traurig

(57) ABSTRACT

In a virtual environment implemented using multiple hosts, a first host maintains records identifying virtual objects and entities which control the virtual objects. When a second host receives a request of a first entity acquiring the control of a virtual object from a second entity, the second host instructs the first host to: update a first record to remove the virtual object from a view simulation of the virtual world servicing the second entity; and adding a second record associating the first entity with the virtual object but having an indicator that prevents the rendering of the virtual object for the first entity. At the time for the completion of the control transfer to the first entity, the second host instructs the first host to update the second record to remove the indicator and thus allow the virtual object to be rendered in the view simulation servicing the first entity.

8 Claims, 18 Drawing Sheets

Related U.S. Application Data application No. 12/208,950, filed on Sep. 11, 2008, now Pat. No. 8,073,778.

(51) Int. Cl.
  *G06Q 20/34* (2012.01)
  *G06Q 20/38* (2012.01)
  *G06Q 40/00* (2012.01)

(52) U.S. Cl.
  CPC ....... *G06Q 20/382* (2013.01); *G06Q 30/0601* (2013.01); *G06Q 40/12* (2013.12)

(56) References Cited

U.S. PATENT DOCUMENTS

| | | | |
|---|---|---|---|
| 5,452,445 A | 9/1995 | Hallmark et al. | |
| 5,778,388 A | 7/1998 | Kawamura et al. | |
| 6,052,684 A | 4/2000 | Du | |
| 6,751,617 B1 | 6/2004 | Anfindsen | |
| 7,690,043 B2 * | 3/2010 | Saunders | G07F 17/3237 463/42 |
| 8,073,778 B2 | 12/2011 | Williams et al. | |
| 2002/0188678 A1 * | 12/2002 | Edecker | H04L 67/131 709/204 |
| 2003/0014423 A1 * | 1/2003 | Chuah | G06F 16/289 707/999.102 |
| 2003/0046298 A1 | 3/2003 | Weedon | |
| 2003/0154398 A1 | 8/2003 | Eaton et al. | |
| 2005/0266926 A1 * | 12/2005 | Kesselman | G06F 30/20 463/42 |
| 2006/0178180 A1 | 8/2006 | Jung et al. | |
| 2006/0178218 A1 | 8/2006 | Jung et al. | |
| 2006/0178967 A1 | 8/2006 | Jung et al. | |
| 2006/0178972 A1 | 8/2006 | Jung et al. | |
| 2007/0036328 A1 | 2/2007 | Jung et al. | |
| 2007/0087822 A1 | 4/2007 | Van Luchene | |
| 2007/0106576 A1 | 5/2007 | Jung et al. | |
| 2007/0117615 A1 | 5/2007 | Van Luchene | |
| 2007/0203725 A1 * | 8/2007 | Jung | G06Q 20/10 705/39 |
| 2007/0219999 A1 | 9/2007 | Richey et al. | |
| 2007/0288319 A1 * | 12/2007 | Robinson | G06Q 30/0225 705/14.25 |
| 2008/0111816 A1 | 5/2008 | Abraham et al. | |
| 2008/0220873 A1 * | 9/2008 | Lee | G06N 3/006 463/42 |
| 2008/0256073 A1 | 10/2008 | Detlefs et al. | |
| 2008/0288497 A1 | 11/2008 | Watanabe et al. | |
| 2009/0017916 A1 * | 1/2009 | Blanchard, III | G06Q 10/06 463/42 |
| 2009/0098939 A1 * | 4/2009 | Hamilton, II | G06Q 30/02 717/109 |
| 2009/0106347 A1 * | 4/2009 | Harwood | G06F 9/5055 709/203 |
| 2009/0275403 A1 * | 11/2009 | Proctor | A63F 13/71 463/29 |
| 2009/0276718 A1 * | 11/2009 | Dawson | A63F 13/55 707/999.009 |
| 2010/0023560 A1 | 1/2010 | Erb | |
| 2010/0070377 A1 | 3/2010 | Williams et al. | |
| 2010/0306318 A1 * | 12/2010 | Fitzpatrick | G06F 16/9535 345/157 |
| 2012/0011016 A1 | 1/2012 | Williams et al. | |

OTHER PUBLICATIONS

U.S. Appl. No. 13/238,458, filed Sep. 21, 2011, Ryan D. Williams, et al, Abandoned—Failure to Respond to an Office Action, dated Oct. 15, 2017.

U.S. Appl. No. 12/208,950, filed Sep. 11, 2008, Ryan D. Williams, et al., U.S. Pat. No. 8,073,778, Issue Date: Dec. 6, 2011.

Amendment under 37 CFR Sec. 1.312 dated Aug. 24, 2011, U.S. Appl. No. 12/208,950, filed Sep. 11, 2008.

Notice of Allowance and Fee(s) Due dated Aug. 8, 2011, U.S. Appl. No. 12/208,950, filed Sep. 11, 2008.

Office Action dated Dec. 21, 2010, U.S. Appl. No. 12/208,950, filed Sep. 11, 2008.

Response to Office Action dated Mar. 21, 2011, U.S. Appl. No. 12/208,950, filed Sep. 11, 2008.

Response to Restriction Requirement dated Oct. 12, 2010, U.S. Appl. No. 12/208,950, filed Sep. 11, 2008.

Restriction Requirement dated Oct. 5, 2010, U.S. Appl. No. 12/208,950, filed Sep. 11, 2008.

Second Life Wiki. "Which Linden. Office Hours." Oct. 11, 2007, https://wiki.secondlife.com/wiki/User:Which_Linden/Office_Hours/2007_Oct_11.

Second Life Wiki, "Certified HTTP Escrow," Dec. 13, 2007, http://wiki.secondlife.com/wiki/Certified_HTTP_Escrow.

Second Life Wiki, "Certified HTTP," Aug. 22, 2008, http://wiki.secondlife.com/wiki/Chttp.

* cited by examiner

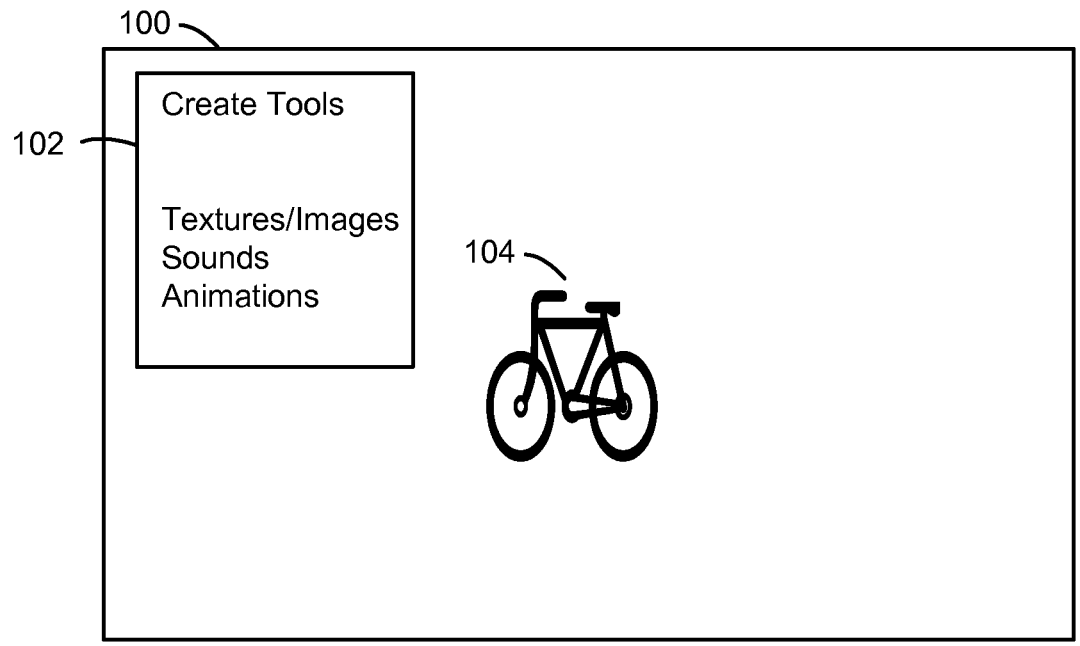

Fig. 7b validate

| User ID | Resource ID | Flag |
|---|---|---|
| 740 → 0002 | 5005 | 1 |

| User ID | Account balance | Accessible amount | Reserve amount |
|---|---|---|---|
| 745 → 0001 | 100 L$ | 100 L$ | 0 L$ |
| 746 → 0002 | 50 L$ | 50 L$ | 0 L$ |

Fig. 7c gather

| User ID | Resource ID | Flag |
|---|---|---|
| 740 → 0002 | 5005 | 1 |
| 741 → 0001 | 5006 | 0 |

| User ID | Account balance | Accessible amount | Reserve amount |
|---|---|---|---|
| 745 → 0001 | 100 L$ | 80 L$ | 20 L$ |
| 746 → 0002 | 50 L$ | 50 L$ | 0 L$ |

Fig. 7d deliver

| User ID | Resource ID | Flag |
|---|---|---|
| 740 → 0002 | 5005 | 1 |
| 741 → 0001 | 5006 | 1 |

| User ID | Account balance | Accessible amount | Reserve amount |
|---|---|---|---|
| 745 → 0001 | 80 L$ | 80 L$ | 0 L$ |
| 746 → 0002 | 70 L$ | 70 L$ | 0 L$ |

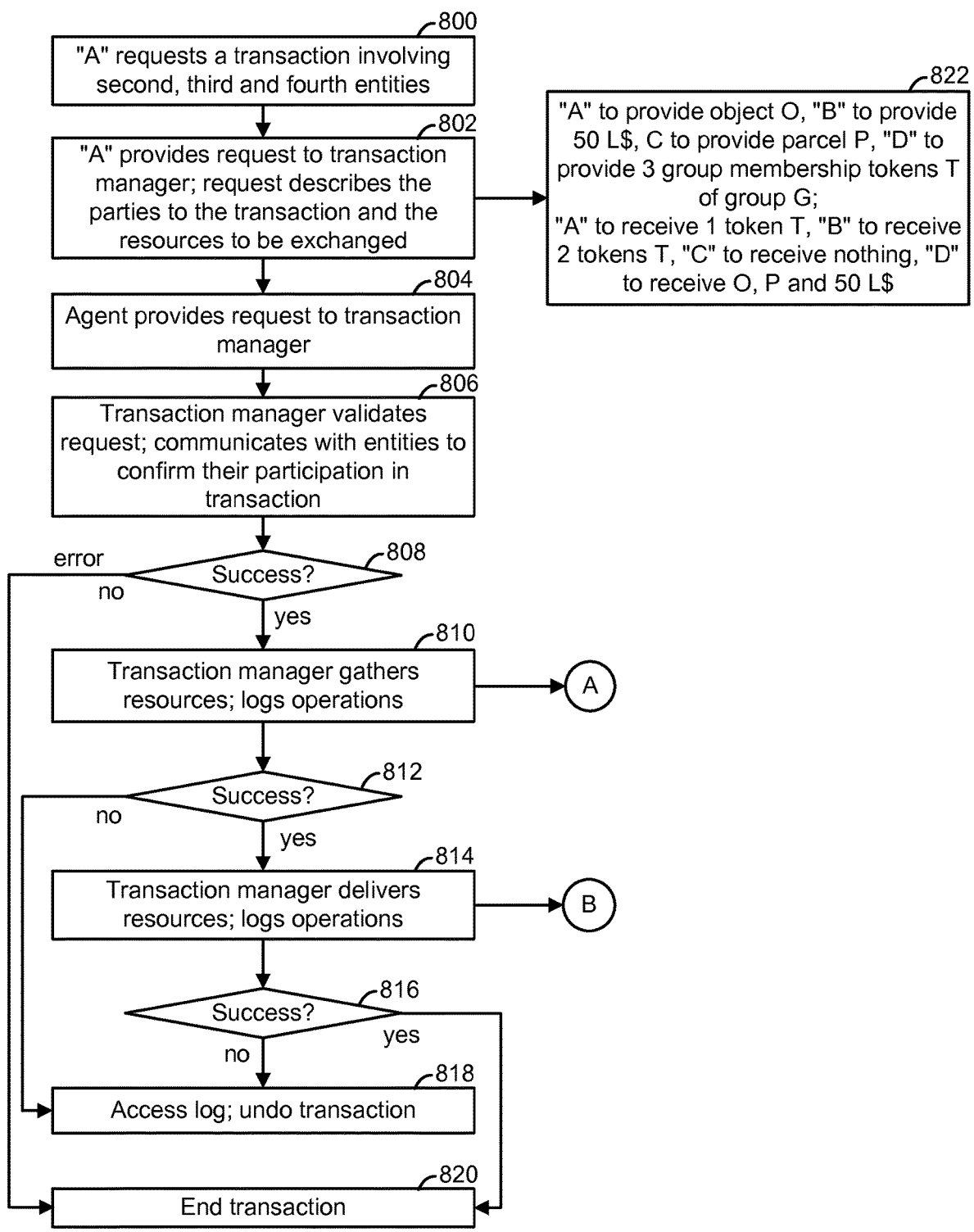

Fig. 8d validate

| User ID | Resource ID | Flag |
|---|---|---|
| A | O | 1 |
| C | P | 1 |

868 → A O 1
869 → C P 1

| User ID | Account balance | Accessible amount | Reserve amount |
|---|---|---|---|
| B | 100 L$ | 100 L$ | 0 L$ |
| D | 75 L$ | 75 L$ | 0 L$ |

870 → B
871 → D

| User ID | G membership balance | Accessible amount | Reserve amount |
|---|---|---|---|
| D | 3 T | 3 T | 0 |

| Group ID | membership balance | Accessible amount | Reserve amount | membership limit |
|---|---|---|---|---|
| G | 27 T | 27 T | 0 | 30 T |

873 → G

Fig. 8f gather

| User ID | Resource ID | Flag |
|---|---|---|
| A | O | 0 |
| C | P | 0 |
| D | O | 0 |
| D | P | 0 |

868 → A O 0
869 → C P 0
875 → D O 0
876 → D P 0

| User ID | Account balance | Accessible amount | Reserve amount |
|---|---|---|---|
| B | 100 L$ | 50 L$ | 50 L$ |
| D | 75 L$ | 75 L$ | 0 L$ |

870 → B
871 → D

| User ID | G membership balance | Accessible amount | Reserve amount |
|---|---|---|---|
| D | 3 T | 0 T | 3 T |

872 → D

Fig. 8g deliver

| User ID | Resource ID | Flag |
|---|---|---|
| A | O | 0 |
| C | P | 0 |
| D | O | 1 |
| D | P | 1 |

868 → A O 0
869 → C P 0
875 → D O 1
876 → D P 1

| User ID | Account balance | Accessible amount | Reserve amount |
|---|---|---|---|
| B | 50 L$ | 50 L$ | 0 L$ |
| D | 125 L$ | 125 L$ | 0 L$ |

870 → B
871 → D

| User ID | G membership balance | Accessible amount | Reserve amount |
|---|---|---|---|
| D | 0 T | 0 T | 0 T |
| A | 1 T | 1 T | 0 T |
| B | 2 T | 1 T | 0 T |

872 → D
873 → A
874 → B

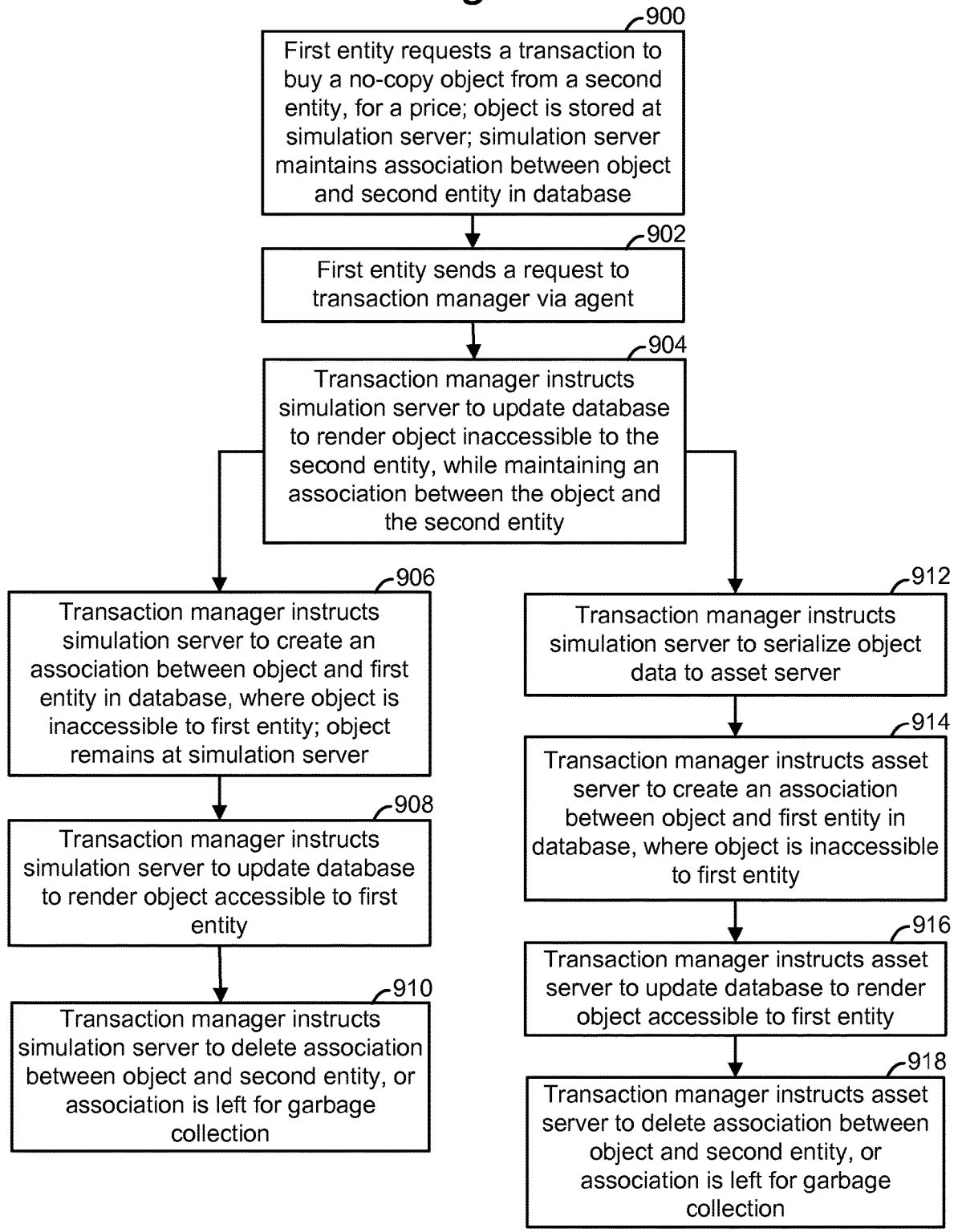

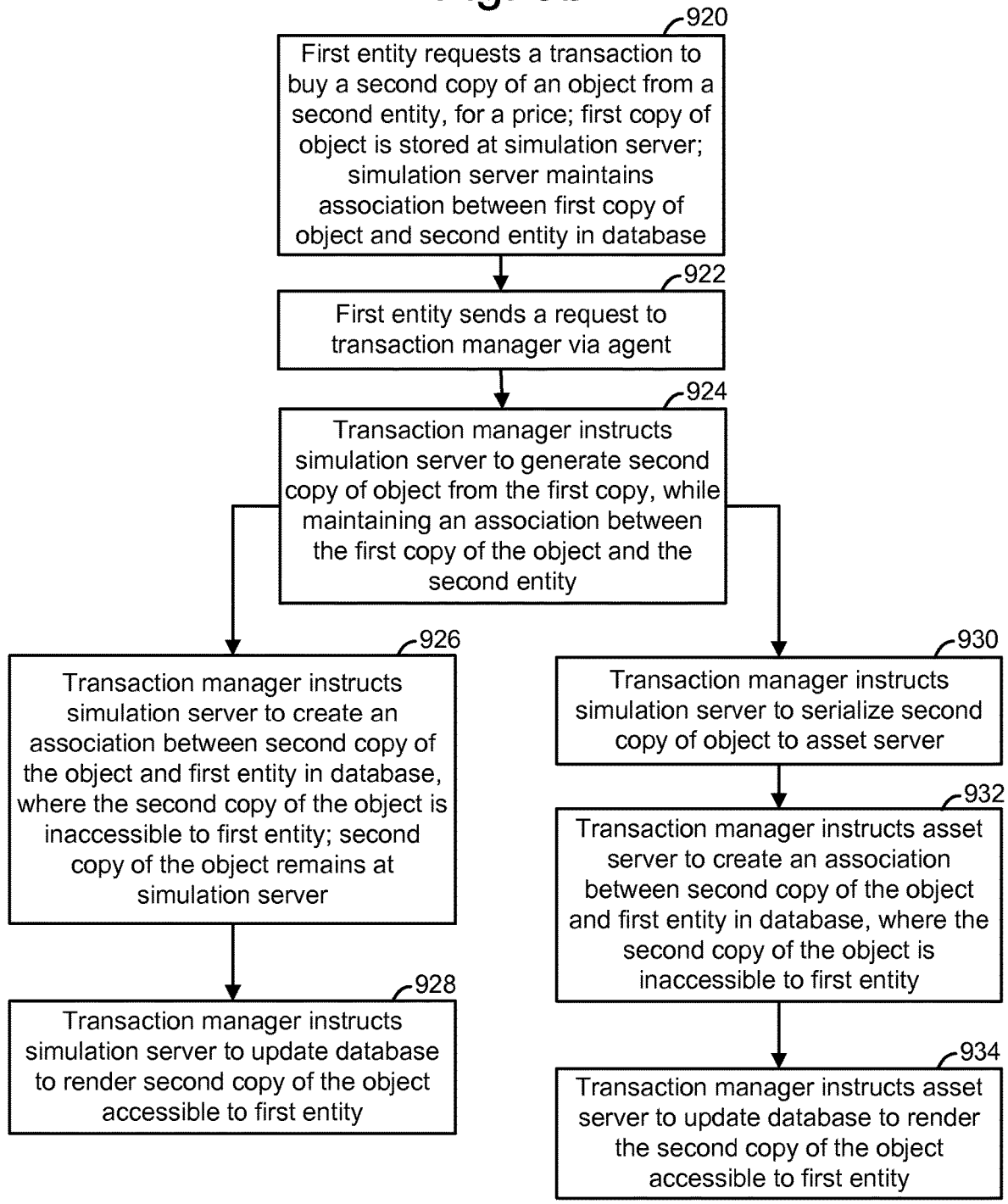

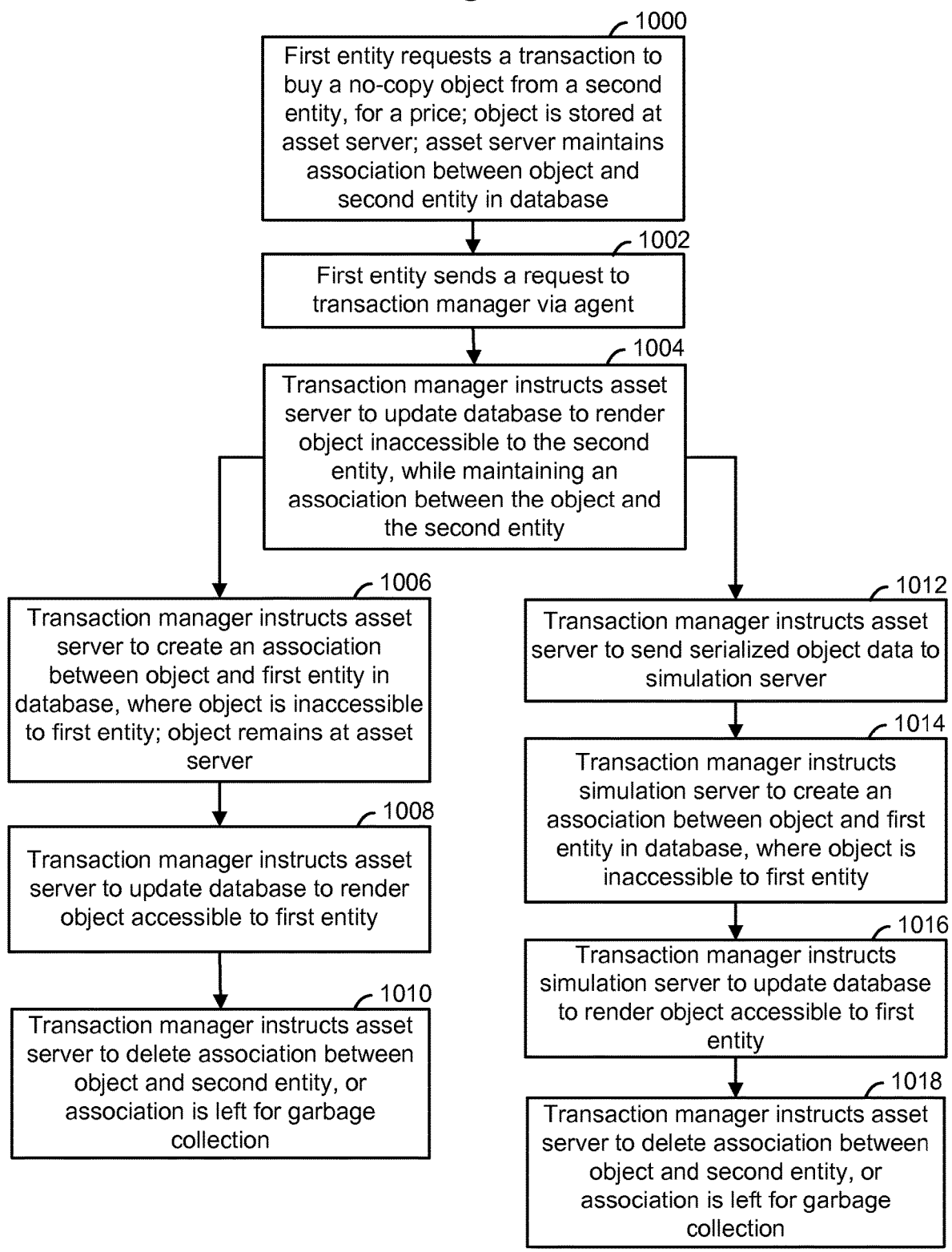

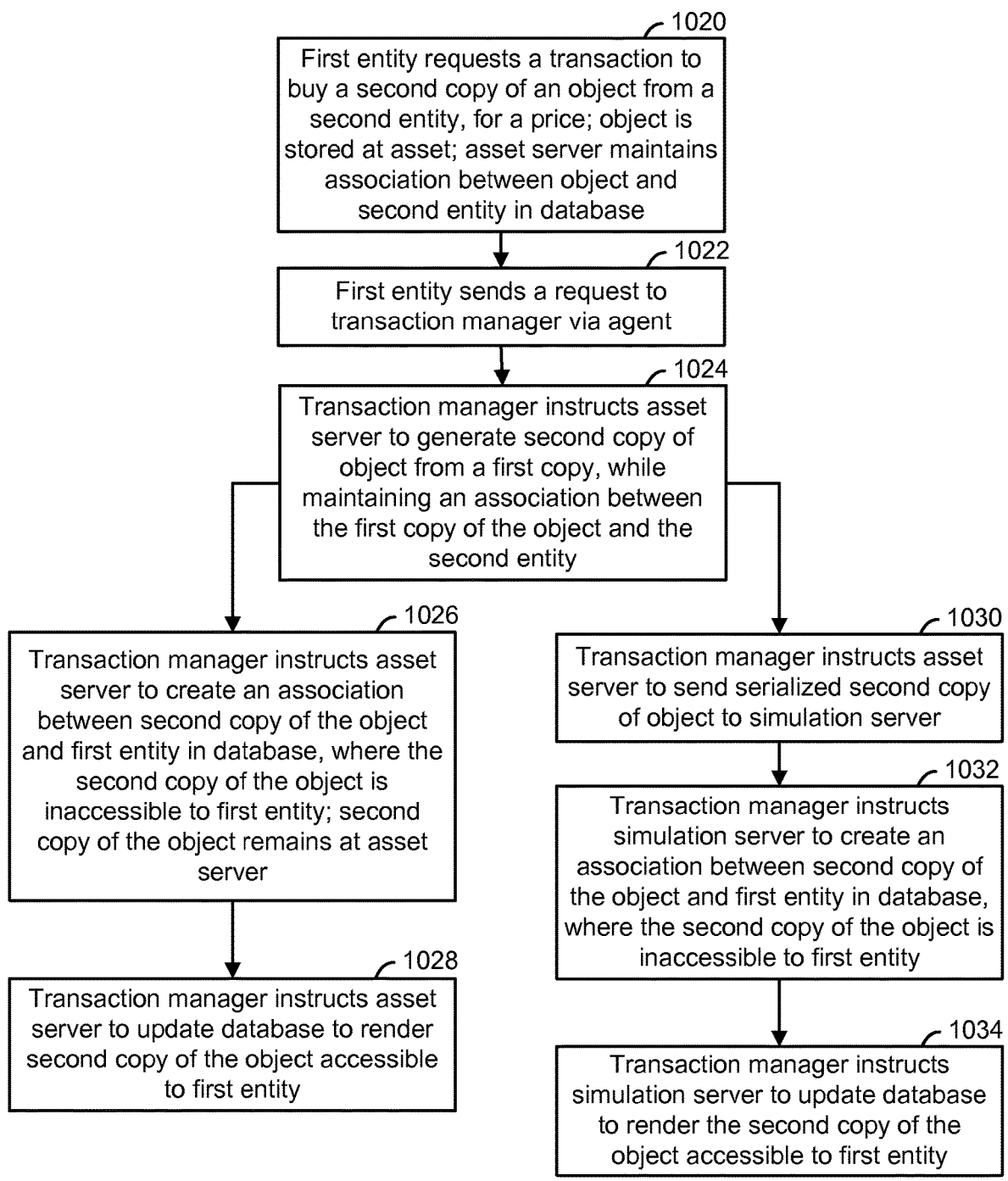

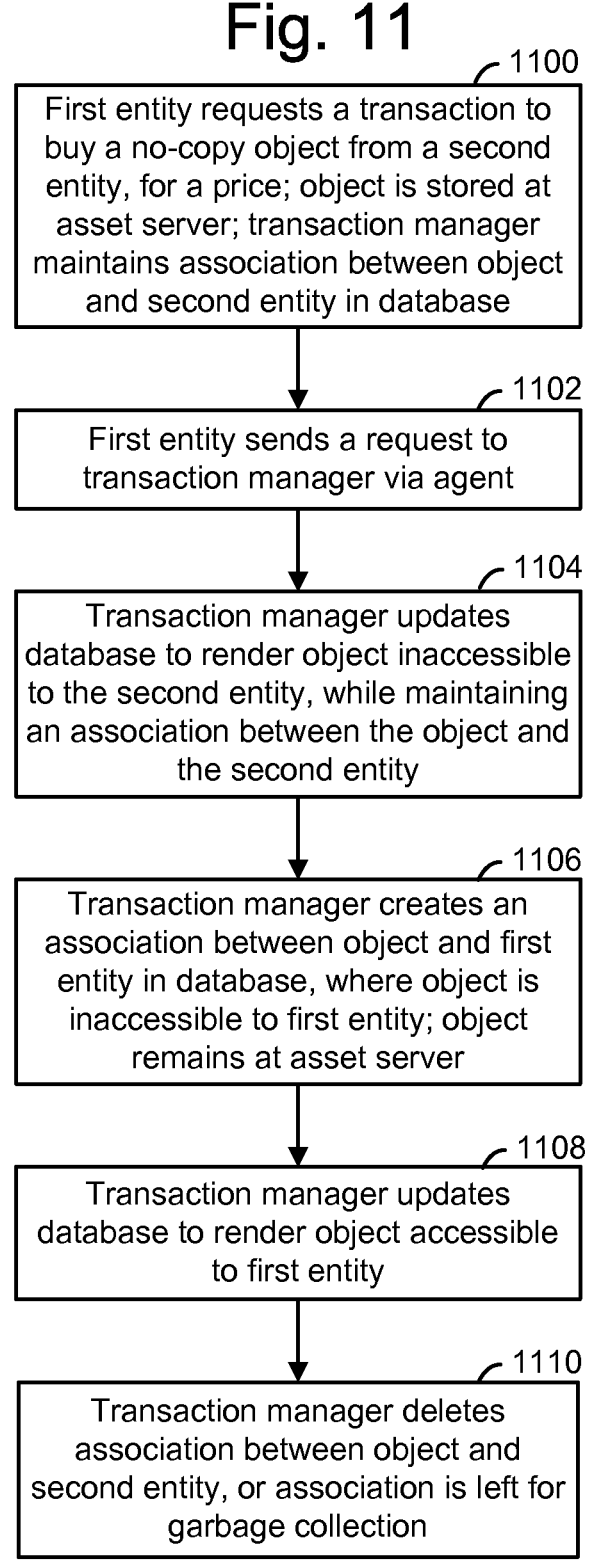

SCALABLE SYSTEMS AND METHODS TO TRANSFER CONTROL OF VIRTUAL OBJECTS OF A VIRTUAL WORLD IMPLEMENTED ON MULTIPLE HOSTS

RELATED APPLICATIONS

The present application is a continuation application of U.S. patent application Ser. No. 13/238,458, filed Sep. 21, 2011, which is a divisional application of U.S. patent application Ser. No. 12/208,950, filed Sep. 11, 2008 and issued as U.S. Pat. No. 8,073,778 on Dec. 6, 2011, the entire disclosures of which applications are here by incorporated herein by reference.

FIELD OF THE TECHNOLOGY

The present invention relates to virtual environments.

BACKGROUND

Virtual worlds allow a large number of users to interact with one another in a shared virtual environment. SECOND LIFE® by LINDEN LAB® is one example of a virtual world. Users control avatars and explore a virtual environment, meeting other users, socializing, participating in individual and group activities, and creating objects and services. Moreover, users can interact by buying or exchanging objects. In some cases, real world currency is used to purchase virtual currency which is used in the virtual environment. Such virtual currency creates incentives for users to create new and interesting objects and services. The virtual environment thus can provide a sophisticated marketplace in which users exchange valuable resources with one another to enhance their in world experience and even to make a real world profit. However, with the increasing importance of such marketplaces, there is a need to ensure the integrity of transactions in the virtual environment.

SUMMARY OF THE DESCRIPTION

The present invention provides a method and system for managing transactions, such as the sale and exchange of resources, in a virtual environment.

In one embodiment, a method for managing a transaction in a virtual environment includes receiving a request, via at least one network, to perform a transaction which involves multiple entities, including at least first and second entities. The request identifies a first resource to be provided from the first entity to the second entity and a second resource to be provided from the second entity to the first entity. In response to the request, the method includes initiating a gathering process which includes attempting to: (a) remove control of the first resource from the first entity, (b) remove control of the second resource from the second entity, and (c) update one or more databases to indicate that the second resource is associated with the first entity but is inaccessible to the first entity. If the gathering process is successfully completed, the method includes delivering the first and second resources, including providing control of the first resource to the second entity, and providing control of the second resource to the first entity by updating the one or more databases to indicate that the second resource is accessible to the first entity.

In another embodiment, a method for managing a transaction in a virtual environment includes receiving a request, via at least one network, to perform a transaction which involves multiple entities in the virtual environment, where the request identifies at least a first entity which controls a first copy of a resource, and at least a second entity which is to gain control of a second copy of the resource in exchange for a payment. The method further includes, in response to the request, initiating a gathering process which includes attempting to: (a) generate and store the second copy of the resource, (b) update one or more databases to indicate that the second copy of the resource is associated with the second entity but is inaccessible to the second entity, and (c) secure the payment from an account of at least one of the multiple entities. If the gathering process is successfully completed, the method further includes providing control of the second resource to the second entity by updating the one or more databases to indicate that the second resource is accessible to the first entity, and crediting the payment to an account of at least one of the multiple entities.

In another embodiment, a system for managing a transaction in a virtual environment includes at least a first host which maintains records, the records include identifiers of resources and identifiers of entities which control the resources, and at least a second host for receiving requests via at least one network from the different entities via respective different hosts to initiate transactions involving the resources. The at least a second host: (a) receives a request for a particular transaction involving a first entity acquiring a first resource in exchange for a payment, instructs the at least a first host to update the records, including adding a record which associates the first entity with the first resource, but temporarily preventing access to the first resource by the first entity, (b) instructs the at least a first host to secure the payment from an account of the first entity and (c) upon receipt of assurances including a confirmation from the at least a first host, instructs the at least a first host to update the record which associates the first entity with the first resource to allow access to the first resource by the first entity.

Corresponding methods, systems and computer- or processor-readable storage devices which store code which, when executed, perform the methods described herein, may be employed.

BRIEF DESCRIPTION OF THE DRAWINGS

FIG. 1a depicts a user interface in which a user creates an object.

FIG. 1b depicts a menu by which a user sets permissions for an object.

FIG. 7b depicts a data structure associated with the process of FIG. 7a in a validation phase of a transaction.

FIG. 7c depicts a data structure associated with the process of FIG. 7a after a gathering phase of a transaction.

FIG. 7d depicts a data structure associated with the process of FIG. 7a after a delivering phase of a transaction.

FIG. 8a depicts a process in which several entities swap resources with one another.

FIG. 8b depicts a gathering phase of the process of FIG. 8a.

FIG. 8c depicts a delivering phase of the process of FIG. 8a.

FIG. 8d depicts a data structure associated with the process of FIG. 8a in a validation phase of a transaction.

FIG. 8e depicts a data structure for a group in the process of FIG. 8a.

FIG. 8f depicts a data structure associated with the process of FIG. 8a after a gathering phase of a transaction.

FIG. 8g depicts a data structure associated with the process of FIG. 8a after a delivering phase of a transaction.

FIG. 9a depicts a process in which an original object at a simulation server is purchased.

FIG. 9b depicts a process in which a copy of an object at a simulation server is purchased.

FIG. 10a depicts a process in which an original object at an asset server is purchased.

FIG. 10b depicts a process in which a copy of an object at an asset server is purchased.

FIG. 11 depicts an alternative process in which an original object at an asset server is purchased.

DETAILED DESCRIPTION

Figure 2A:
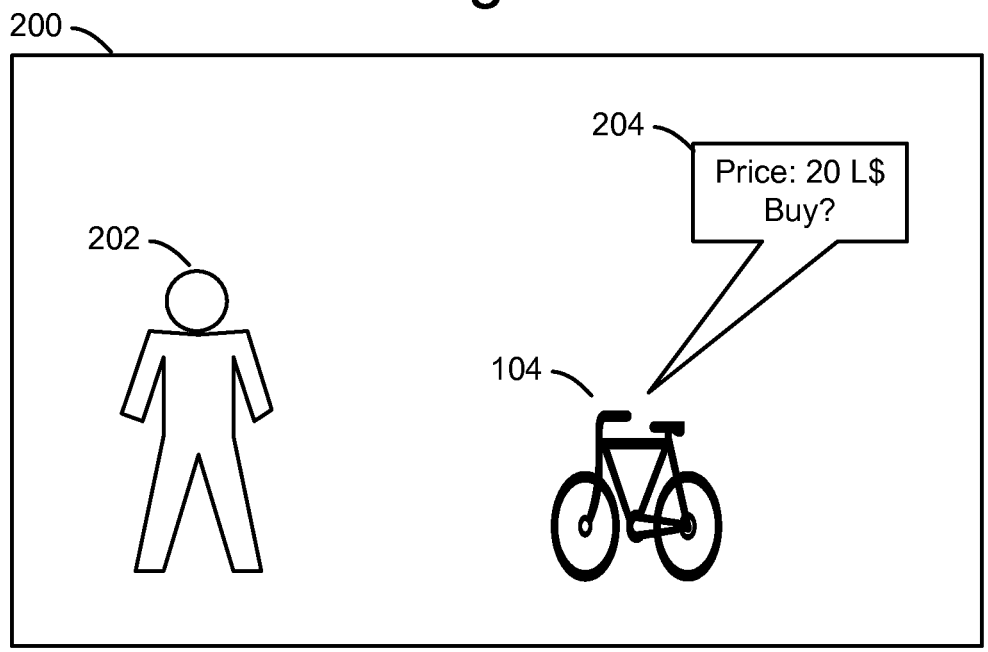
FIG. 2a depicts a user interface in which a user selects an object which is for sale.

The present invention provides a method and system for managing transactions, such as the sale and exchange of resources, in a virtual environment.

FIG. 1a depicts a user interface in which a user creates an object. An on-screen user interface display 100 allows a user to create an object to be used in the virtual environment. Generally, the virtual environment may provide a marketplace which allows users to create and sell their unique creations to other users. The users can trade any type of resource, include goods and services. For example, a user can create a pet, vehicle, house, furniture, game, clothing, shoes, decorations, jewelry, plants, guns, timepieces, signs, fountains, animals or a new body. A create tools menu 102 provides an example of various characteristics which can be customized, including textures, sounds and animations. A user can upload texture/image files, sound files and animation files to create an object. In this example, a bicycle 104 is created.

A resource such as an object can have various permissions associated with it which allow a user to express his or her intent as to how it can be used. Permissions allow a user who creates or owns a resource to control what other users can do with the resource. Permissions can include: modify, copy, resell/give away and move. When selected, "modify" lets the next owner modify the resource. Otherwise, no modifications are allowed. Selecting "copy" lets the next owner copy the resource. For example, the next owner can retain a copy in his or her inventory. Otherwise, no copies are allowed. Selecting "Resell/Give Away" lets the next owner transfer the resource to someone else. If the resource also permits copy, the next owner can sell copies of the original copy. If the resource does not permit copy, the next owner can only sell the original copy. When "Resell/Give Away" is not selected, the next owner cannot sell or give the resource to anyone else. If the resource permits copying but not Resell/Give Away, the next owner can make as many copies as desired for his or her own use, but can not give a copy away or sell it. When selected, "move" allows the user to move the resource to a different location in the virtual environment. For example, to sell clothing that the next owner can alter, copy into new outfits, but never sell, the user selects modify and copy but not transfer.

In some cases, a script is associated with an object to create an effect such as how the object looks, moves, interacts with avatars, and communicates. In such cases, permissions can be set for both the object and the associated script. For example, to sell a single bicycle such that the next owner can change its shape and color, but cannot examine or modify the script, the user selects modify and transfer for the object but not copy, and selects transfer for the script but not modify or copy.

When a resource such as an object is created or acquired by a user, it may be stored in an inventory of the user in one or more databases. The user can set permissions in different ways. In one approach, the user accesses a menu 110 in a new window (FIG. 1b) such as by clicking on the object when it is displayed on the user interface 100, and then selecting an inventory item description option to view the menu 110. In another approach, permissions can be set while the object is not displayed, such as by accessing a file which contains the object.

FIG. 1b depicts a menu 110 by which a user can set permissions for an object. The menu includes a portion 112 which describes the item, including name, description field, creator, owner and data acquired. A portion 114 indicates permissions which are associated with the current owner. In this example, the item has been created by a first user, Jenny T., and acquired by a second user, Joe P., such as in a sale or trade. The creator has set certain permissions which cannot be changed to protect the integrity of her work. In this case, the modify, copy, resell/give away and move options have been selected, as indicated by the check marks in the boxes, to allow these options. These permissions are displayed in a grayed out manner to indicate that they cannot be changed by the current owner. However, the current owner does have the ability to set permission regarding sharing the object with a group, allowing anyone to copy the object, and allowing anyone to move the object. These options are currently unselected.

A portion 116 of the menu 110 provides options which can be set by the current owner to control permissions which are imposed on the next owner, in the event that the current owner transfers the object to another user in a sale or other exchange. For example, the current owner can indicate whether the next owner can modify, copy, resell/give away, or move the object. Currently, these options are selected, as indicated by the check marks in the boxes. A portion 118 of the menu 110 allows the current owner to mark the object as being for sale and to set a price. Additional fields labeled "original" and "copy" have been checked and are grayed out, indicating that these setting cannot be changed. The check mark for the "original" field indicates that the object is the same as the originally created object. That is, it has not been modified since it was created. The check mark for the "copy" field indicates that the object is a copy of the originally created object. After making the desired selections, the user can select "save" to save the changes or "cancel" to not save any changes.

FIG. 2a depicts a user interface in which a user selects an object which is for sale. An on-screen user interface display 200 depicts a scene in the virtual environment. The FIG. 202 may be an avatar which represents a user. Here, the user notices the bicycle object 104 and clicks on it with a mouse or other pointing device to bring up a display 204 which indicates that the object is for sale, and that the price is 20 L$. The symbol "L$" represents LINDEN DOLLARS which is a unit of virtual currency in the virtual environment of SECOND LIFE. This virtual currency can be translated to a real world currency, and vice-versa. In other cases, the virtual currency cannot be translated to real currency. The virtual currency can represent a unit of money, tokens or the like. If the user is interested in buying the object, the user clicks on the display 204 to access a display 206 (FIG. 2b).

Figure 2B:
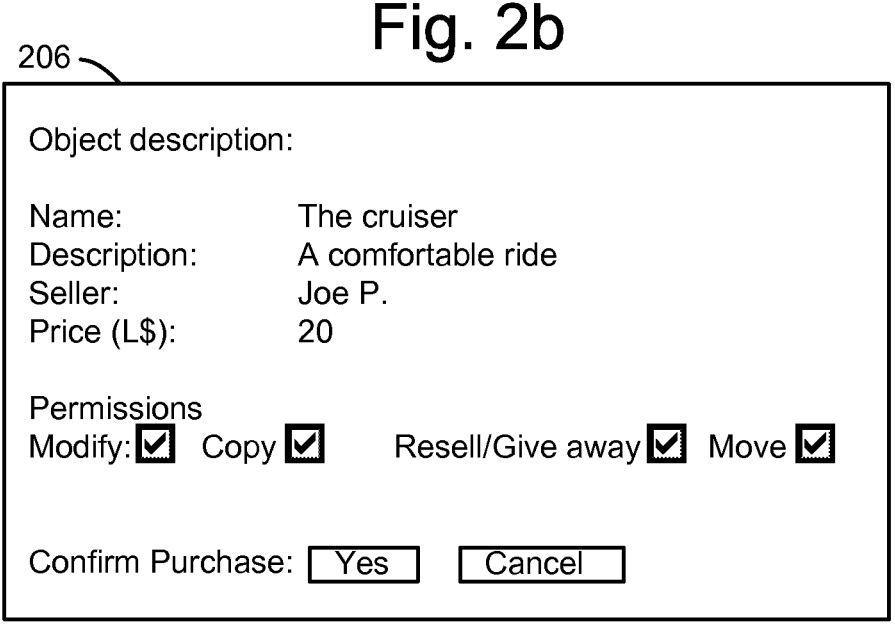
FIG. 2b depicts a display which provides details regarding an object for sale.

FIG. 2b depicts a display which provides details regarding an object for sale. The window 206 provides some of the information that was present in the menu 110 of FIG. 1b, such as an object description. This includes a name of the object, "The cruiser," a description, "A comfortable ride," the seller, "Joe P.", the price "20 L$, and the permissions which have been set by the current owner. In this case, the permissions are: modify, copy, resell/giveaway and move. The window 206 allows the user to confirm his purchase by selecting "yes," or "cancel" to not purchase the object.

Figure 3:
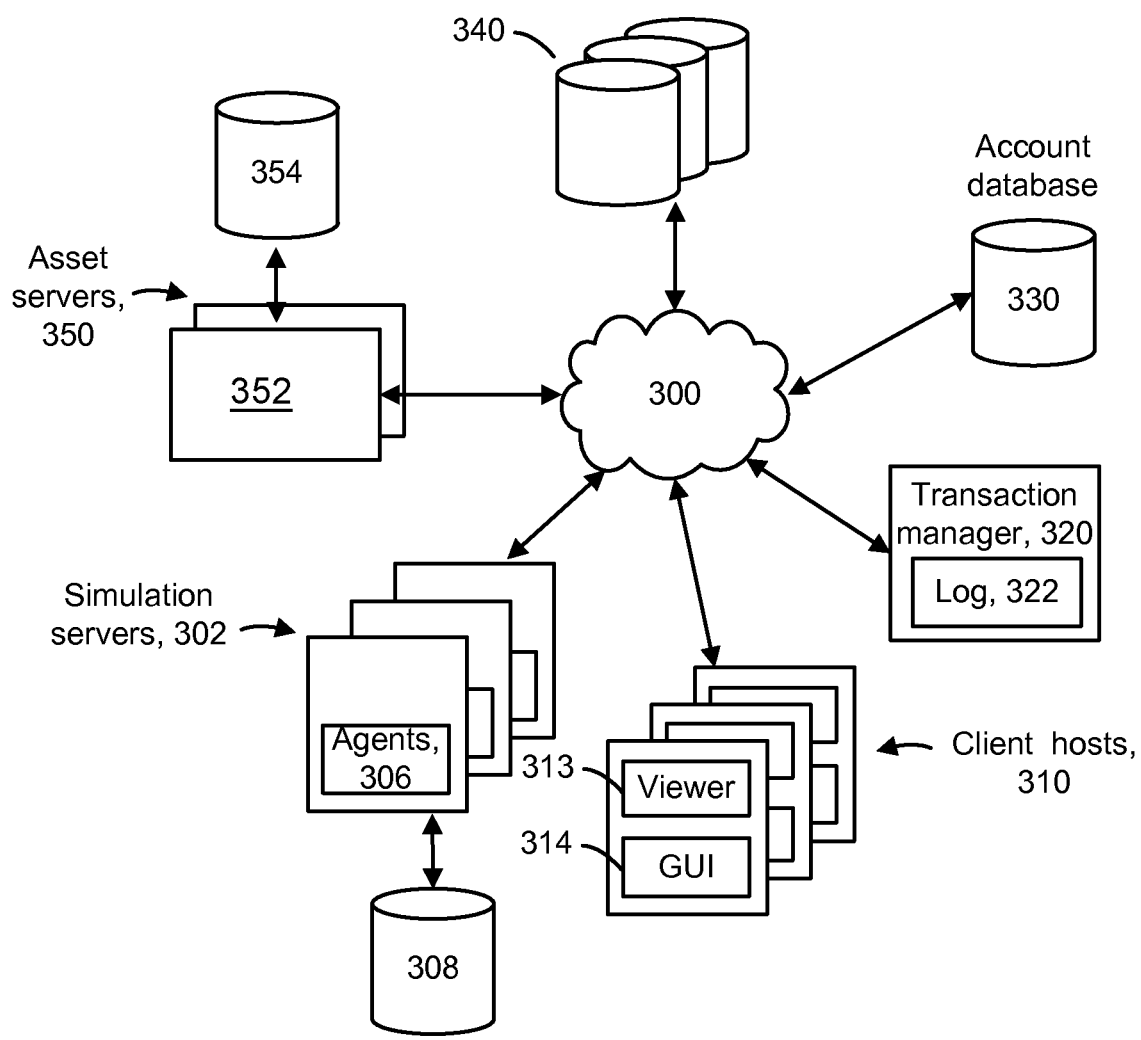
FIG. 3 depicts a system which provides a virtual environment.

FIG. 3 depicts a system which provides a virtual environment. A virtual environment which provides the capability to sell and otherwise exchange resources among users can have various configurations. One example system includes a number of components which communicate with one another via at least one network 300. The network 300 may include a VPN for instance, or may use a secure Internet connection such as by using Hypertext Transfer Protocol (HTTP) over Secure Sockets layer (SSL) or other reliable messaging layer. A reliable messaging layer can include, e.g., HTTP, Advanced Messaging Query Protocol (AMQP), an open Internet Protocol for Business Messaging or Certified HTTP (CHTTP). AMQP is an open Internet Protocol for Business Messaging, being developed as a royalty-free specification through industry collaboration. See the AMQP 0-10 Specification: AMQP: A General-Purpose Middleware Standard. 291 pages (2006) Copyright Cisco Systems et al. CHTTP, a collaboration between IBM and LINDEN LAB, implements reliable transactions by performing exactly-once messaging between two hosts. It allows guaranteed operation and confirmation of operations between multiple systems, using HTTP as the underlying network protocol. Generally, a reliable messaging layer can be connection oriented, such as with HTTP, or connectionless, such as with User Datagram Protocol (UDP), if a request-response protocol is used to ensure that messages are successfully received.

Here, a number of simulation servers 302 are provided to simulate different respective regions of a virtual environment. For example, these may be different contiguous geographic regions. This distributed approach divides the computational load among different servers. For further information, see US 2003/0195735, titled "Distributed Simulation," published Oct. 16, 2003, incorporated herein by reference. Each simulation server may run a physics engine which calculates the movement of objects in the virtual environment, detect collisions between objects, keep track of the locations of objects, and communicate with client hosts 310 of the users to update a viewer process 313 at each client host.

The simulation servers send information to the client hosts such as updates regarding the location of the objects, to allow the client hosts to render a portion of the virtual environment. The viewer process uses data from the physics engine, such as object velocities, to keep track of the movement of objects in the portion of the virtual environment which is being viewed. The client hosts, which may be laptop or desktop computers, for instance, or other, portable computing devices, include graphical user interfaces (GUIs) 314 such as screens for displaying images from the virtual environment. An audio capability is also typically provided. Each respective simulation server need only send updates to clients who are currently viewing the portion of the virtual environment which is simulated by the respective simulation server. Further, the simulation servers may communicate with each other such as to provide information regarding objects which cross over to different regions of the virtual environment.

The simulation servers 302 may include agents 306 for facilitating communications with the client hosts 310. Each simulation server creates an agent as a software process for each user that is connected to the simulation server. The agent handles communication between the simulation server and the viewer.

The simulation servers 302 may access one or more databases 308 to store information regarding resources such as objects which are in cache memory at the simulation servers. Generally, the simulation servers may load objects from one or more asset servers 350, including example asset server 352, to provide the virtual environment. Such objects are considered to be "in world" since they can be represented in the virtual world in the simulation. Objects in the asset servers are not in world because they must be transferred to the simulation server to provide the virtual environment. The asset servers can provide reliable storage of objects in files using backup techniques such as mirroring. The asset servers 350 may access one or more databases 354 to store information regarding resources such as objects which are stored at the asset servers.

Additional databases 340 may be provided to store information regarding the objects which are associated with particular users. For example, the databases 340 may be accessed directly by a transaction manager 320. The transaction manager 320 can be provided on a host to manage transactions such as the sale or other exchange of resources between users in the virtual environment. The transaction manager 320, described in further detail below, ensures that such transactions are reliably handled, even in the event of a failure. The transaction manager 320 may write to a log 322 which is flushed to a disk to provide a record of the operations it carries out to assist in recovering from failures. An account database 330 may be used to maintain balances of virtual currency of the users, or balances of tokens of other value, such as tokens which permit the users to become a member of a group, and so forth.

The servers and databases may be provided on reliable hosts. A reliable host typically has a mirrored hard drive backup, a paging system to repair personnel, is generally available, and is a trusted.

Any of the components of the system may include computer- or processor-readable storage devices which store code which, when executed, perform the methods described herein.

Figure 4:
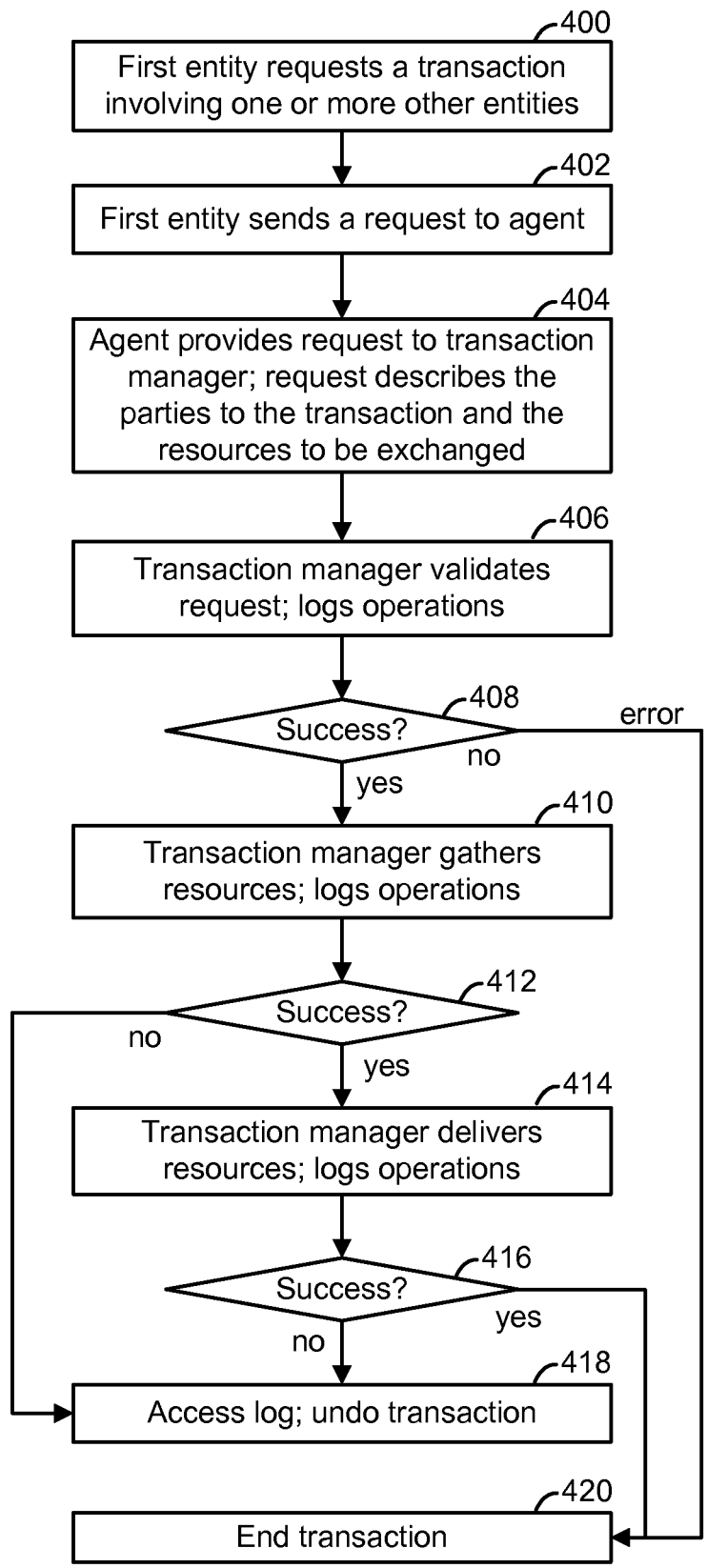
FIG. 4 depicts a high-level block diagram of a process for conducting a transaction for exchanging resources.

FIG. 4 depicts a high-level block diagram of a process for conducting a transaction for exchanging resources. As mentioned, users in the virtual environment can trade any type of resource, include virtual currency, goods and services, whether by sale, barter, gift or other means. Generally, multiple users can participate in a transaction, where various types of resources are exchanged. A transaction includes contributing and receiving entities. Each entity can be both a contributor and a receiver, a contributor only or a receiver only. It is also possible for an entity which is not specifically controlled by a user to participate in a transaction. For example, a user may purchase an item from a virtual vending machine, or from an automated clerk in a virtual store. Also, an automated entity of a user can initiate a transaction with another entity, which can be controlled by another user, or automated. For example, a user may have an automated entity that buys objects of a certain type when the entity becomes aware of the object and it meets certain conditions. Or, an automated entity of a user can initiate a transaction with another entity which is also controlled by the same user. Various options are possible. Thus, an entity can include a user, the user's avatar, the user's host, or any other participant in a transaction, for instance. Further, the number of participants in a transaction can be any number, is not limited to two.

At step 400, a first entity requests a transaction involving one or more other entities. In one possible example, a first entity desires to purchase an object from a second entity in exchange for virtual currency, in a type of swap transaction. The first entity may be considered an initiator which initiates and specifies a transaction, such as via an interface of the type discussed in FIGS. 2a and 2b. At step 402, the first entity sends a request to its agent at a particular simulation server. At step 404, the agent provides the request to the transaction manager. The request identifies the participants in the transaction and the resources to be exchanged. The transaction manager executes the request and returns a response to the client.

An example form of the request for a "swap" transaction follows:

```
{'operation':'swap',
'contents': {
'gather' : [{'name':'payment',
    'owner': <buyer id>,
    'type':'L$',
    'value':20 },
    {'name':'object',
    'owner': <seller id>,
    'type':'object',
    'value': {'asset_id': <object id>}} ],
'distribute' : [
    {'owner' : 'buyer', 'name': 'object'}
    {'owner' : 'seller', 'name': 'payment'} ],
'metadata' : { ... }
}
transaction_id: abc-123
```

The request defines a gather operation which obtains a payment of the buyer ("<buyer id>"), which has a type of "L$" and an amount of "20." Thus, the buyer is to pay 20 L$ in the transaction. Further, the request associates an asset or resource identifier (asset_id) with an object identifier ("<object id>"). The request further defines a distribute operation in which the buyer becomes the owner of the object and the seller becomes the owner of the payment. A transaction identifier is also provided which allows the transaction manager to access information from its log for a particular transaction, if necessary, to recover from a failure.

Another example form for the request is:

```
{'operation':'swap',
'contents': {'resources':
    {'a': {'kind':'t1','owner':'o1','value':'v1', 'new_owner':'o2'},
    'b': {'kind':'t2','owner':'o2','value':'v2', 'new_owner':'o1'}}}}.
```

This syntax identifies the current owner and the new owner of a resource, and a kind of the resource. The transaction manager uses the 'kind' fields to locate an appropriate plug-in to handle the resource. For example, a resource may include a file in a format such as TGA, BMP, JPG, PNG, WAV, MP3 or BVH, or a script such as LSL (Linden Scripting Language).

At step 406, the transaction manager validates the request, such as by parsing it and ensuring that it conforms to a particular format, and logs its operations. The transaction manager can also load a plug-in to handle the resource. If the validating phase is successful, at decision step 408, the transaction manager gathers the resources as described in the request and logs its operations, at step 410. If the validation phase fails, at decision step 408, such as when the request does not follow a prescribed format, the transaction manager can simply not proceed with the transaction and cause an error message to be returned to the first entity.

In the gathering phase, the resources are gathered from the one or more contributing entities, e.g., using an appropriate resource plug-in. Generally, the gathering process renders the resources unusable except for completing or reversing the transaction. The plug-ins should be written to detect as many logical errors as possible during the gathering phase. If the gathering phase is successful, at decision step 412, the transaction manager delivers the resources to the one or more receiving entities and logs its operations at step 414. If the gathering phase fails, at decision step 412, the transaction manager returns any resources which it has gathered to their respective owners. The gathering phase may fail, e.g., when a plug-in notifies the transaction manager of a logical error. If a transient error, discussed further below, arises, the plug-in may retry until the error is resolved. At step 418, the transaction manager accesses the log to determine which resources have been successfully gathered, and undoes the transaction by essentially performing operations which reverse those operations which were successfully completed.

If a logical error arises during the gather phase, the transaction manager will have a record of which resources have already been gathered in the log, and can perform the following steps on each resource that has already been gathered. The transaction manager uses the resource plug-in to perform an 'undo' operation, which has the effect of restoring the resource to its original state prior to when the gather operation took place. The plug-in should be written to avoid the possibility of logical failures in the undo operation, but this is sometimes unavoidable. If a logical failure arises, the plug-in notifies the transaction manager, which flags the transaction for human inspection. If a transient error arises, the plug-in should retry until the transient error is resolved.

If the delivering phase is successful, at decision step 416, the transaction ends, at step 420. The transaction manager may also use a plug-in to perform the delivery operations. The delivering phase gives the person or group identified by the 'new_owner' field ownership control over the resource and frees the resource for all the purposes it can normally be put to by the owner. The plug-ins should be written to avoid the possibility of logical failures in the deliver operation, but this is sometimes unavoidable. If a logical failure arises, the plug-in notifies the transaction manager, which flags the transaction for human inspection. If a transient error arises, the plug-in may retry until the transient error is resolved. The transaction manager may also respond to the initiating entity and/or the participating entities with the results of the transaction, such as with a message of "transaction completed."

If the delivering phase fails, at decision step 416, the transaction manager takes back any resources which it has delivered and returns them to their respective owners. At step 418, the transaction manager accesses the log to determine which resources have been successfully delivered, and undoes the transaction by essentially performing operations which reverse those operations which were successfully completed.

Generally, the transaction manager should be tolerant of transient failures while permitting logical errors to be detected. Various types of failures can occur during a transaction. Transient failures include service interruptions which are caused by random environmental factors, such as network interruptions, hardware failures, scheduled maintenance, and malicious attacks. The primary distinguishing characteristic of a transient failure is that it is both introduced and resolved independent of the logic of the transaction being run by the transaction manager. For example, a transient failure can involve communications between hosts. There may be a network interruption, a host may be down, a server exception may be thrown due to a bug, or a host may not respond even though a connection has been established. Such failures can generally be overcome by waiting for the failure to be repaired over time, or by retrying the communication. One the other hand, a permanent failure generally cannot be overcome. This may include an inability to locate an object involved in a transaction, a banned user trying to perform a transaction, or the like. The transaction manager should ensure the integrity of the transaction in all failures. This means that each party to the transaction should either receive the resource they expected to receive, or be returned to their status at the start of the transaction. A situation should be avoided in which one party provides a payment or other resource but does not receive a purchased item or other expected resource in return. In the present approach, once the gathering phase is successfully completed, the delivering phase can proceed with confidence.

The transaction manager may be considered to provide an escrow service as it is a trusted intermediate party to a transaction, and provides for the equitable handling of a transaction even in the event of a failure. Moreover, the transaction manager can act as a scalable distributed transaction manager for multi-host transactions. The transaction manager can increase scalability by providing the capability to perform transactions across any number of agent data stores, as well as increasing reliability of transactions. Multiple transaction managers can be provided and selected to handle a given request based on load balancing criteria. The transaction manager allows multiple parties who do not necessarily trust each other to engage in a transaction of arbitrary complexity with one another. The parties trust the transaction manager and the transaction manager trusts each party individually. In a case where the transaction manager does not trust a party, it prevents the transaction from happening, or it allows the participants to individually decide whether to continue the transaction.

The transaction manager may be designed to be pluggable when the resources adhere to a standard API and set of constraints. This has two advantages: the core system is more streamlined because it doesn't have to know the details of how the resources are implemented, and new capabilities are as easily added as new resources are.

The system uses reliable hosts and a reliable request-response messaging layer to confirm that each step of the gathering and delivering phase has been successfully completed.

As mentioned, the exchange of an object for virtual currency between two entities is just one example of a transaction. Various other examples, or use cases, of transactions follow.

Partnering: This can involve one entity (A) agreeing to add another entity (B) as a partner, e.g., in a virtual marriage or partnership, a business partnership or for other reasons. The management (M) of the virtual environment, which operates the system, may optionally receive a fee (L$) for this transaction, e.g., from the requesting entity, as follows:

| | Parties: | | |
|---|---|---|---|
| | A | B | M |
| Gather: | L$, A's agreement | B's agreement | |
| Distribute: | B's agreement | A's agreement | L$ |

Create Group: This can involve creating a group for a fee. The group may have a restricted membership.

| | Parties: | |
|---|---|---|
| | A | M |
| Gather: | L$ | Group token |
| Distribute: | Group token | L$ |

Friendship: Entities A and B agree to be friends and to provide certain permissions to each other, e.g., to use objects, enter certain private areas of the virtual environment, activate a script for an object, and so forth.

| | Parties: | |
|---|---|---|
| | A | B |
| Gather: | permissions_for_B | permissions_for_A |
| Distribute: | permissions_for_A | permissions_for_B |

Gift of virtual currency: A gives B some L$.

| | Parties: | |
|---|---|---|
| | A | B |
| Gather: | L$ | |
| Distribute: | | L$ |

Buy Parcel: A buys a parcel from B. A parcel may represent an area of land owned by a single user or group.

| | Parties: | |
|---|---|---|
| | A | B |
| Gather: | L$ | Parcel |
| Distribute: | Parcel | L$ |

Buy Parcel for Group. A buys a parcel from B for group G. A tier may represent a land tax which is paid.

| Parties | | | |
|---|---|---|---|
| | A | B | G |
| Gather: | L$ | Parcel | Tier for parcel |
| Distribute: | | L$ | Parcel |

Buy Object Contents. A buys object contents from B's object, O. In this case, B receives the payment and the object O provides the contents. Object contents may be a type of inventory for objects, where items in the Object Contents can be provided to other users and objects. For example, a bike can be purchased out of a virtual vending machine.

| Parties | | | |
|---|---|---|---|
| | A | B | O |
| Gather: | L$ | | Contents |
| Distribute: | Contents | L$ | |

Give Object Contents: Object O gives A its contents.

| Parties | | |
|---|---|---|
| | A | O |
| Gather: | | Contents |
| Distribute: | Contents | |

Buy Original Object. A buys B's object.

| Parties | | |
|---|---|---|
| | A | B |
| Gather: | L$ | Object |
| Distribute: | Object | L$ |

Buy Object Copy. A buys a copy of B's object.

| Parties | | |
|---|---|---|
| | A | B |
| Gather: | L$ | Object copy |
| Distribute: | Object copy | L$ |

Join Group. A joins group G for a fee. The number of available membership passes, or openings for new members, is decremented. In this case, the membership of the group is limited to a designated number. Likewise, a user is only allowed to join a designated number of groups.

| Parties | | |
|---|---|---|
| | A | G |
| Gather: | L$, Group Opening | Membership Pass |
| Distribute: | Membership Pass | L$ |

Buy Parcel Pass. A buys a parcel pass to enter B's parcel.

| Parties | | |
|---|---|---|
| | A | B |
| Gather: | L$ | Parcel Pass |
| Distribute: | Parcel Pass | L$ |

Buy Parcel Pass from Group. A buys a parcel pass to enter group G's parcel.

| Parties | | |
|---|---|---|
| | A | G |
| Gather: | L$ | Parcel Pass |
| Distribute: | Parcel Pass | L$ |

Deed Parcel. A deeds a parcel to group G.

| Parties | | |
|---|---|---|
| | A | G |
| Gather: | Parcel | |
| Distribute: | | Parcel |

Deed Parcel and Tier. A deeds a parcel and tier to group G.

| Parties | | |
|---|---|---|
| | A | G |
| Gather: | Parcel, Tier | |
| Distribute: | | Parcel, Tier |

Figure 5:
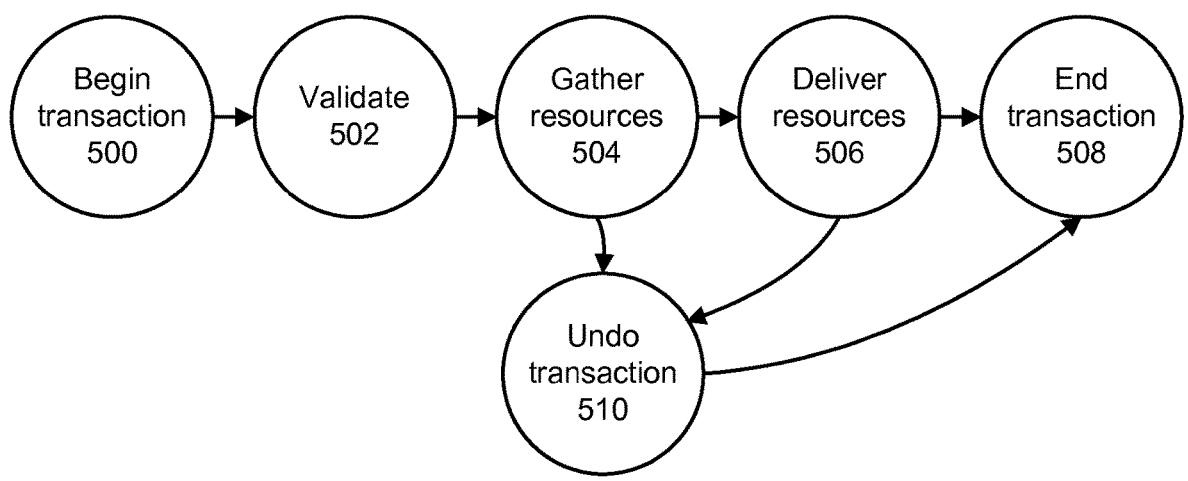
FIG. 5 depicts a state diagram of a transaction manager.

FIG. 5 depicts a state diagram of a transaction manager. As discussed, the transaction manager can enter different phases or states in carrying out a transaction. Each state is represented by a circle, and transitions between the states are represented by arrows. State 500 represents the beginning of a transaction. This state can be entered when the transaction manager receives a request to initiate a transaction. In a validate state 502, steps are taken to verify that the request conforms to an expected format. This can avoid problems such as trying to gather an identified resource from an unidentified entity. In a gather resources state 504, resources of the contributing parties are gathered so that the parties no longer have access to, and control over, the resources. In a deliver resources state 506, resources which the receiving parties are to receive are distributed so that the parties have access to, and control over, the resources. State 508 represents the end of the transaction. The undo transaction state 510 can be entered from the gather resources state 504 and the deliver resources state 506.

Figure 6A:
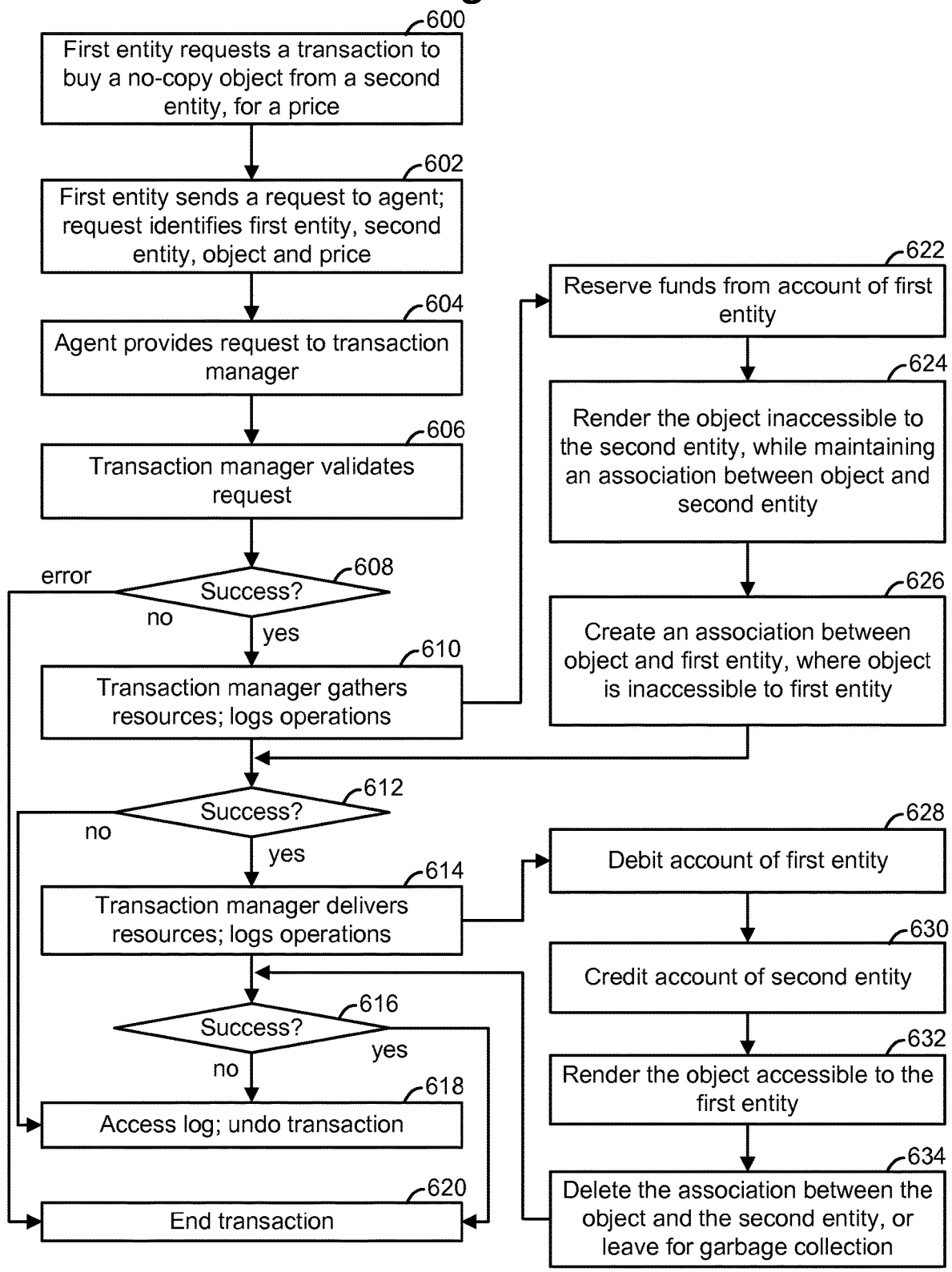
FIG. 6a depicts a process in which an entity buys an original object from another entity.

FIG. 6a depicts a process in which an entity buys an original object from another entity. In this example, the object has a no-copy permission which applies to the buyer. The original object is thus the existing copy of the object. At step 600, the first entity requests a transaction. The user can enter a request to purchase an object using the user interface provided by the viewer and a mouse or other input device. At step 602, the first entity sends a request to an agent, where the request identifies the first entity as the buyer, a second entity as a seller, the object and the price. The object may have a unique identifier, referred to as a universally unique identifier (UUID), which references the object. The UUID may also identify the host that created the UUID to assist in locating the object. At step 604, the agent provides the request to the transaction manager. At step 606, the transaction manager validates the request. At decision step 608, if the validation is not successful, an error is declared and the transaction ends at step 620. At decision step 608, if the validation is successful, the transaction manager gathers the resources described in the request and logs its operations, at step 610. If the gathering phase is successful, at decision step 612, the transaction manager delivers the resources and logs its operations at step 614. If the delivering phase is successful, at decision step 616, the transaction is complete, at step 620. If the steps 610 and 613 are unsuccessful, the transaction manager accesses the log and undoes the transaction, at step 618.

In this example, the gathering of step 610 includes reserving funds from an account of the first entity in an amount of the price, at step 622. This can involve the transaction manager communicating with the account database 330, for instance, which maintains the account. This approach ensures that a balance in the account is sufficient to cover the price, while allowing the first entity to continue to access other remaining funds. Thus, there is no need to lock the entire account. Essentially, control of the funds is transferred to the transaction manager. In another possible approach, the transaction manager has an account which is credited with the payment and the first entity's account is debited for the payment. A transaction fee may be imposed as well which is provided to the management of the virtual environment via the transaction manager, for instance.

Step 624 includes rendering the object inaccessible to the second entity, while maintaining an association between the object and the second entity. Thus, the transaction manager removes control of the object from the second entity. As explained further below, e.g., in connection with FIGS. 6b-6e, a database record may be maintained which indicates that the second entity is the owner, or otherwise has control over, a particular object. The record may also include a reference which indicates where the object data is stored, e.g., at the simulation server, asset server or other location. Further, the record may include an enable/disable flag such as a bit. When set to enable, the viewer of the second entity can access the resource, such as when the viewer searches its inventory of objects. When set to disable, the viewer of the second entity can not access the resource, so that it is hidden from the viewer during the gathering phase. However, the record remains so that it can be enabled again upon flipping the bit. The enable/disable status of a record can be provided in other ways as well. For example, a record may be moved between a first database of enabled records and a second database of disabled records, to identify its status.

Step 626 includes creating an association between the object and the first entity, where the object is inaccessible to the first entity. As explained further below, e.g., in connection with FIGS. 6b-6e, a database record may be provided which indicates that the first entity is the owner, or otherwise has control over, a particular object. Further, the record may include an enable/disable flag such as a bit, as discussed, which is set to disable the record so that it is hidden from the viewer of the first entity during the gathering phase.

The delivery phase of step 614 may include debiting the account of the first entity at step 628. For example, the previously reserved amount can be debited. Step 630 includes crediting the account of the second entity in the amount of the payment. Step 632 includes rendering the object accessible to the first entity, such as by flipping the enable/disable bit to enable. For example, the transaction manager may communicate with the database which includes the reference to the object to set the bit. Step 634 includes deleting the association between the object and the second entity, or performing no action, which leaves the deletion to a garbage collection process of the database over time. Thus, the second entity can no longer access the object, which is appropriate in this no-copy sale example.

Figure 6B:
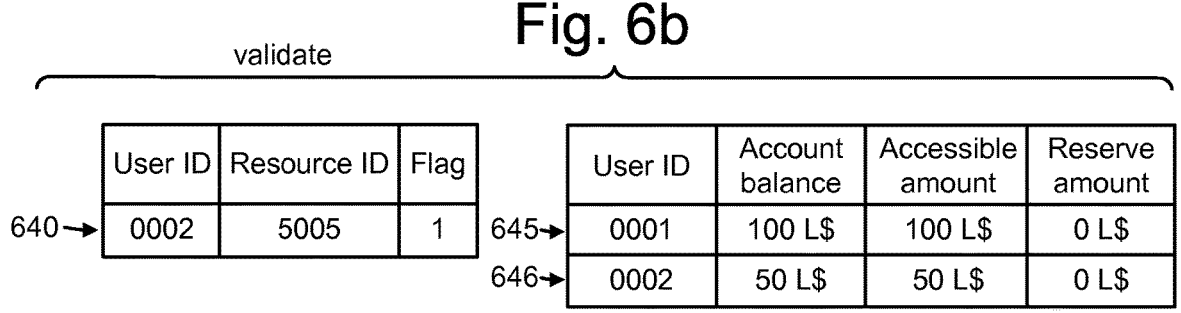
FIG. 6b depicts a data structure associated with the process of FIG. 6a in a validation phase of a transaction.

FIG. 6b depicts a data structure associated with the process of FIG. 6a in a validation phase of a transaction. In one approach, database records are maintained which identify objects which are associated with a user, and which include a reference to another location where the object data is stored. The reference can be in the resource ID (UUID). The object data itself typically consumes a substantial amount of data and is therefore stored offline until it is needed in the simulation. For example, the object may be stored at the asset server in a serialized format. When a user participates in the virtual environment such as by executing a login process, objects in the user's inventory can be brought in world, into the simulation, by transferring them from the asset server to one or more of the simulation servers. Database records can be maintained to associate the current copy of the object with a user so that access to the object is provided only to the appropriate user. For example, during the validation phase, prior to the gathering phase, a record 640 indicates that a second user having the id "0002" is associated with a particular resource, e.g., an object having an identifier "5005", and that an enable/disable flag is set to "1" (enable), so that the object is visible to the user. Other records, not shown, may describe other objects which are owned by the first and second users, who are participants in the transaction, and other users who are not participants in the transaction.

A record 645, which may be maintained by the account database 330, indicates that the first user, having the id "0001," has an account balance of 100 L$, of which 100 L$ is available and 0 L$ is reserved. Also, a record 646 indicates that the second user, having the id "0002," has an account balance of 50 L$, of which 50 L$ is available and 0 L$ is reserved.

Figure 6C:
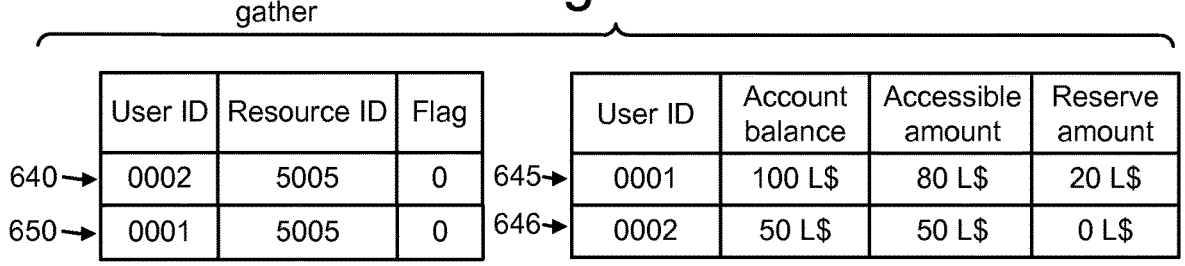
FIG. 6c depicts a data structure associated with the process of FIG. 6a after a gathering phase of an transaction.

FIG. 6c depicts a data structure associated with the process of FIG. 6a after a gathering phase of a transaction. At this point, records indicate that control of the resources has temporarily been removed from the participants and transferred to the transaction manager. In particular, the record 640 is updated to indicate that the enable/disable flag is set to "0" (disable) for the resource which is involved in the transaction. However, since the record 640 still is active, the resource is still associated with the second user so that it can be returned to the second user upon flipping the bit again, in the event the transaction fails to complete. Additionally, a new record 650 is created which indicates that the same resource "5005" is also associated with the first user, "0001," and the enable/disable flag is set to "0" (disable). Thus, the resource is also inaccessible to the first user. The same resource ID is used since this is a no-copy example.

Further, the record 645 is updated to indicate that a reserve amount of 20 L$ has been imposed on the account of the first user, so that the available balance is reduced to 80 L$. The second user's account is unchanged (record 646).

Figure 6D:
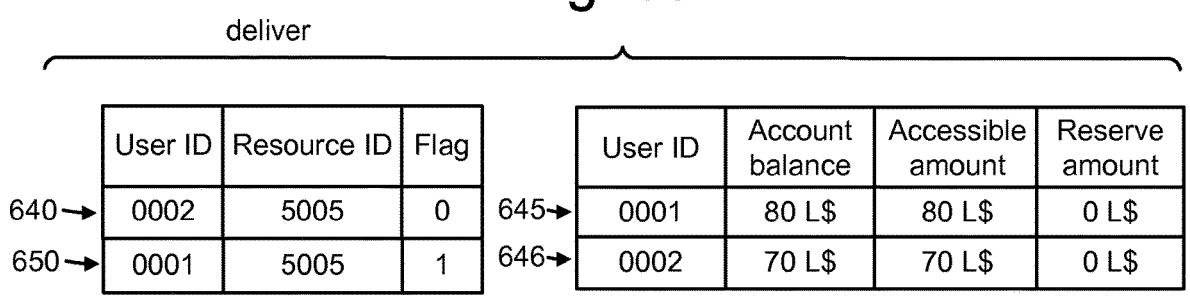
FIG. 6d depicts a data structure associated with the process of FIG. 6a after a delivering phase of a transaction.
Figure 6E:
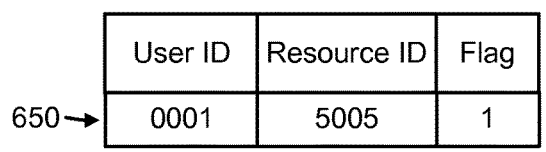
FIG. 6e depicts a data structure associated with the process of FIG. 6a after a delivering phase of a transaction, where a record is deleted.

FIG. 6d depicts a data structure associated with the process of FIG. 6a after a delivering phase of a transaction. The record 650 is updated to indicate that the enable/disable flag is set to "1" (enable) for the first user so that the resource is now accessible to the first user. The record 640 can be deleted by a deletion command, leaving the record 650 of FIG. 6e, or no action can be taken, in which case a garbage collecting process can eventually delete the record. FIG. 6e depicts a data structure associated with the process of FIG. 6a after a delivering phase of a transaction, where a record is deleted. Further, the record 645 is updated to indicate that the account of the first user has been debited by 20 L$, leaving an account balance and an available balance of 80 L$, and a reserve amount of 0 L$. Further, the record 646 is updated to indicate that the second user's account is credited for 20 L$, leaving an account balance and an available balance of 70 L$.

Figure 7A:
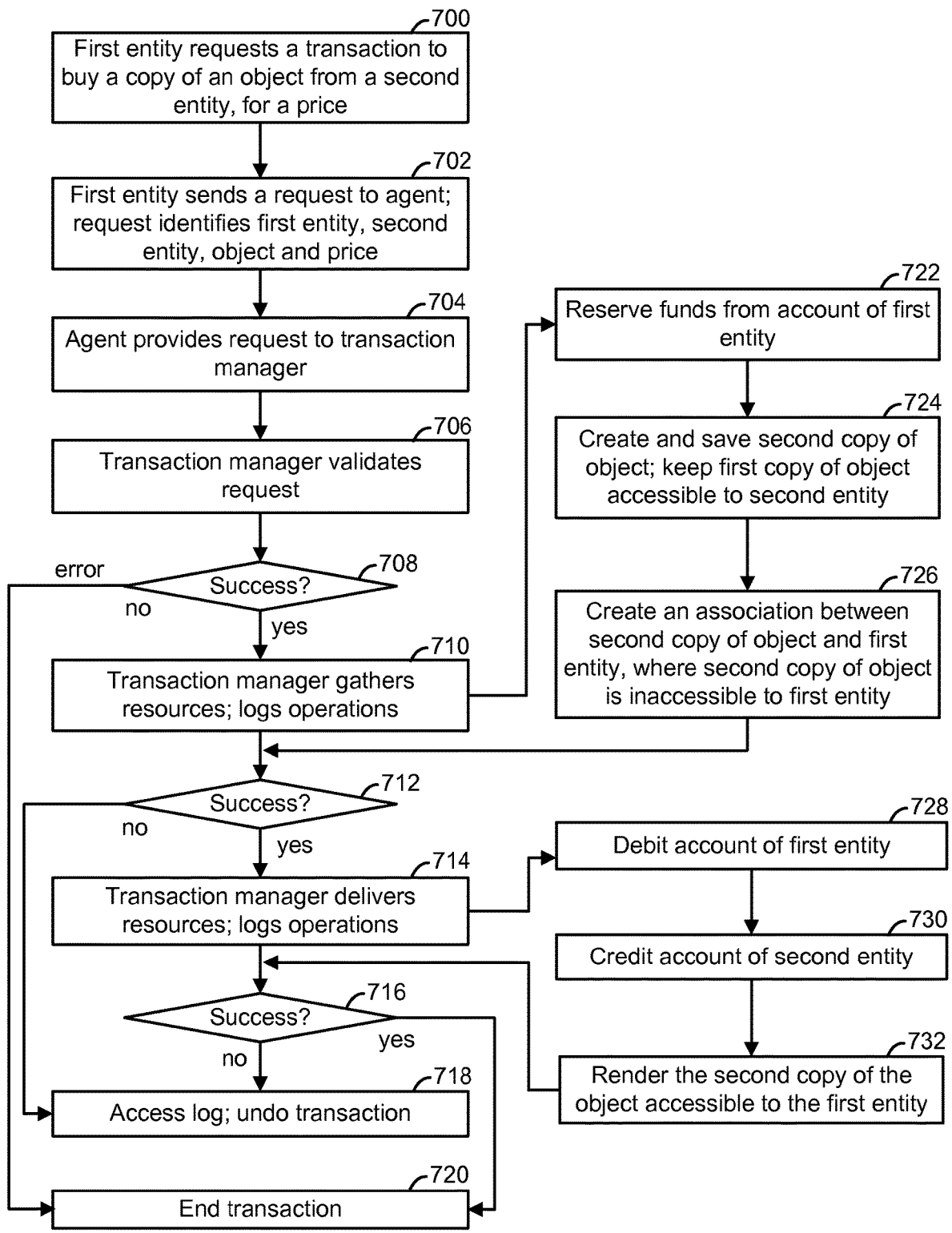
FIG. 7a depicts a process in which an entity buys a copy of an object from another entity.

FIG. 7a depicts a process in which an entity buys a copy of an object from another entity. When a copy is purchased, another copy is retained by the seller. At step 700, the first entity requests a transaction to buy a copy of an object from a second entity for a price. The purchased copy is referred to as a second copy, while the seller's copy is referred to as a first copy. Steps 702, 704, 706, 708, 710, 712, 714, 716, 718 and 720 correspond to steps 602, 604, 606, 608, 610, 612, 614, 616, 618 and 620, respectively, of FIG. 6a.

In this example, the gathering of step 710 includes reserving funds from an account of the first entity in an amount of the price, at step 722. Step 724 includes creating and saving the second copy of the object, and keeping the first copy of the object accessible to the second entity. Step 726 includes creating an association between the second copy of the object and the first entity, where the second copy of the object is inaccessible to the first entity. A further explanation is provided below, e.g., in connection with FIGS. 7b-7d.

The delivery phase of step 714 may include debiting the account of the first entity at step 728. For example, the previously reserved amount can be debited. Step 730 includes crediting the account of the second entity in the amount of the payment. Step 732 includes rendering the second copy of the object accessible to the first entity, such as by flipping the enable/disable bit to enable.

FIG. 7b depicts a data structure associated with the process of FIG. 7a in a validation phase of a transaction. A record 740 indicates that the second user, "0002", is associated with the first copy of the object, resource "5005," and the enable/disable bit is set to enable access to the object. An account record 745 indicates that the first user, "0001," has an account balance and an available balance of 100 L$, and a reserve amount of 0 L$, and the second user, "0002," has an account balance and an available balance of 50 L$, and a reserve amount of 0 L$.

FIG. 7c depicts a data structure associated with the process of FIG. 7a after a gathering phase of a transaction. The record 740 is unchanged. Further, a new record 741 is created which indicate that the second user, "0002", is associated with the second copy of the object, resource "5006," and the enable/disable bit is set to disable access to the object. A second resource ID is used since this example involves a copy. The account record 745 is updated to indicate that the first user, "0001," has an account balance of 100 L$, an available balance of 80 L$, and a reserve amount of 20 L$. The record 746 is unchanged.

FIG. 7d depicts a data structure associated with the process of FIG. 7a after a delivering phase of a transaction. The record 740 is unchanged. The record 741 is updated to indicate that the enable/disable flag is set to "1" (enable) for the first user so that the resource is now accessible to the first user. The record 745 is updated to indicate that the account of the first user has been debited by 20 L$, leaving an account balance and an available balance of 80 L$, and a reserve amount of 0 L$. Further, the record 746 is updated to indicate that the second user's account is credited for 20 L$, leaving an account balance and an available balance of 70 L$.

FIG. 8a depicts a process in which several entities swap resources with one another. As mentioned, the transaction management techniques provided herein can be used for N-party transactions, where the number N of participants can be any number. The technique is suitable for any sort of barter/sale exchange. This flexibility is built into the technique. As a more complicated example, consider a transaction involving first, second, third and fourth entities (A, B, C and D, respectively). In the transaction, A contributes an object O, B contributes 50 L$, C contributes a parcel P, D contributes three group membership tokens T. Also, A receives one group token, B receives two group tokens, C receives nothing, and D receives the object O, the parcel P, and the 50 L$.

At step 800, A, for instance, requests the transaction. At step 802, A provides a request to the transaction manager. As depicted at block 822, A is to provide O, B is to provide 50 L$, C is to provide P, and D is to provide 3 T. Additionally, A is to receive 1 T, B is to receive 2 T, C is to receive nothing and D is to receive O, P and 50 L$.

At step 804, the agent provides the request to the transaction manager. At step 806, the transaction manager validates the request, and may communicate with the involved entities, or at least the entities which did not provide the request, to confirm that they agree to participate. For example, the transaction manager may communicate with the client hosts of B, C and D via a simulation server, or via another channel, to provide information regarding the transaction and to request that the entities confirm their desire to participate. In another approach, the entity which requests the transaction may have a predetermined relationship with the other entities such that separate confirmations are not needed. For example, each of the entities may be members of a group in which the requesting entity has the authority in the group to initiate certain exchanges of resources.

Steps 808, 810, 812, 814, 816, 818 and 820 correspond to steps 608, 610, 612, 614, 616, 618 and 620, respectively, of FIG. 6a.

Figure 8B:
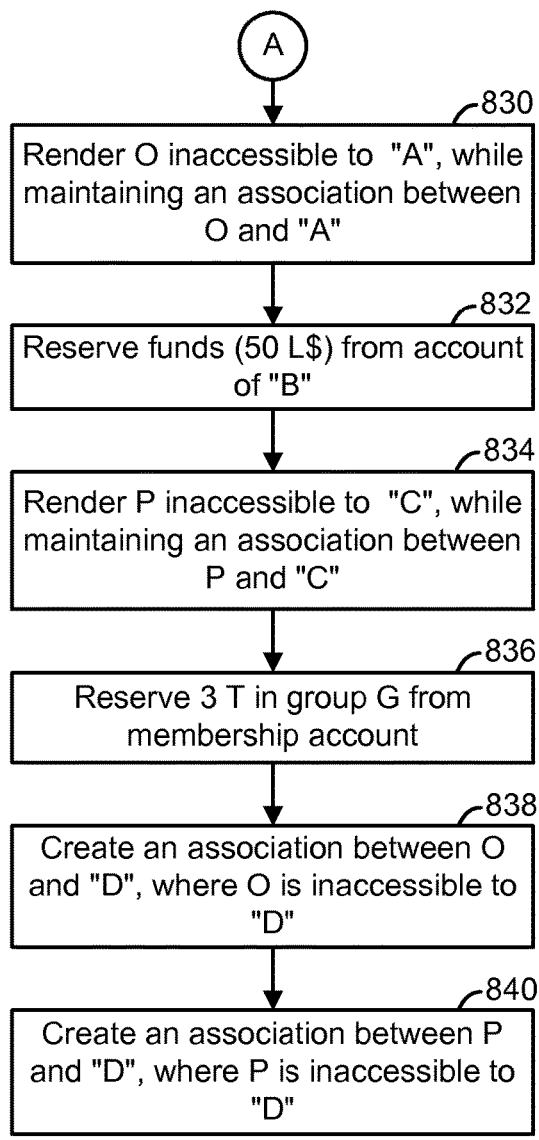

FIG. 8b depicts a gathering phase of the process of FIG. 8a. Step 830 includes rendering O inaccessible to A while maintaining an association between O and A. Step 832 includes reserving funds (50 L$) from the account of B. Step 834 includes rendering P inaccessible to C, while maintaining an association between P and C. Step 836 includes reserving 3 T in group G from a membership account. As mentioned, a group may have a membership account in which it provides openings to a limited number of entities. Step 838 includes creating an association between O and D, where O is inaccessible to D. Step 840 includes creating an association between P and D, where P is inaccessible to D.

Figure 8C:
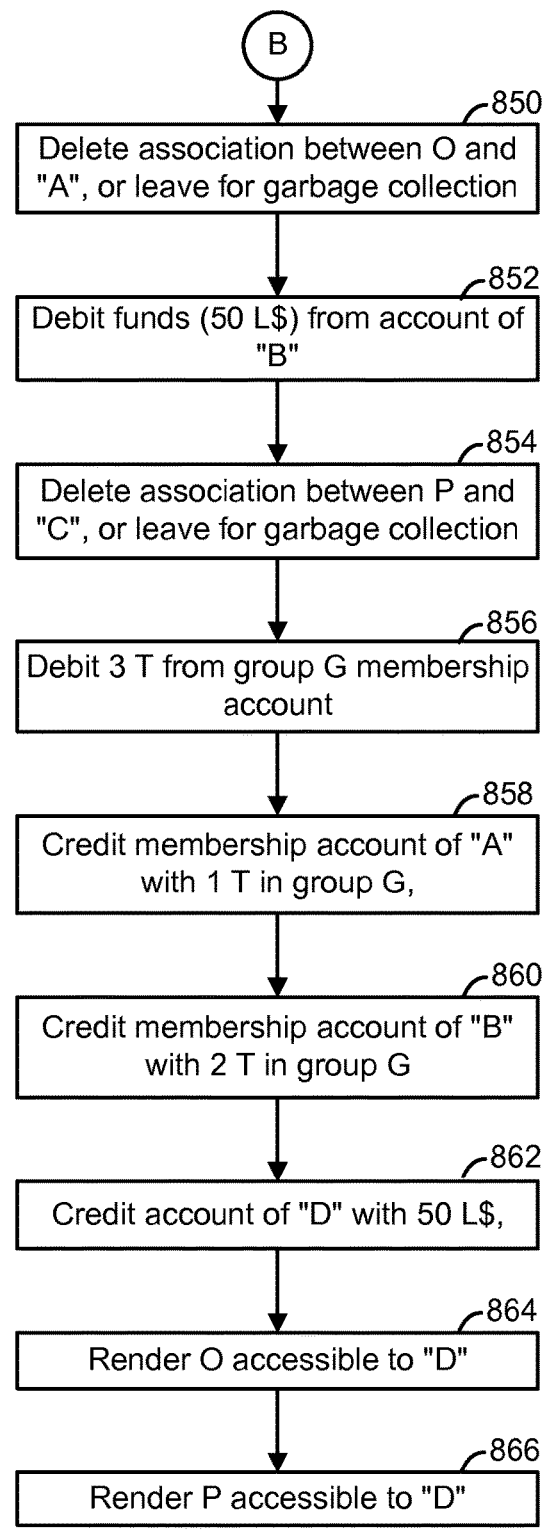

FIG. 8c depicts a delivering phase of the process of FIG. 8a. Step 850 includes deleting the association between O and A, or leaving it for garbage collection. Step 852 includes debiting funds (50 L$) from the account of B. Step 854 includes deleting the association between P and C, or leaving it for garbage collection. Step 856 includes debiting 3 T from the group G membership account. Step 858 includes crediting a membership account of A with 1 T in group G. Like a group, an entity can have a membership account which indicates which groups it can join, in one possible approach. Step 860 includes crediting a membership account of B with 2 T in group G. Step 862 includes crediting an account of "D" with 50 L$. Step 864 includes rendering O accessible to D. Step 866 includes rendering P accessible to D.

FIG. 8d depicts a data structure associated with the process of FIG. 8a in a validation phase of a transaction. A record 868 indicates that entity A is associated with resource O and the enable/disable bit is set to "1" (enable). A record 869 indicates that entity C is associated with resource P and the enable/disable bit is set to "1" (enable). In virtual currency accounting records, a record 870 indicates that entity B has an account balance and an available balance of 100 L$. A record 871 indicates that entity D has an account balance and an available balance of 75 L$. In an entity membership record, a record 872 indicates that entity D has a membership balance of 3 T in group G, and no reserve amount.

FIG. 8e depicts a data structure for a group in the process of FIG. 8a. In a group membership record, a record 873 indicates that the group G has a membership balance of 27 T, an accessible amount of 27 T, a reserve amount of 0 T and a membership limit of 30 T. Such a data structure allows a group to control its membership by limiting the number of members and requiring an entity to have a membership token. Such tokens can have a value similar to currency. In this example, entity D has all 3 outstanding tokens T.

FIG. 8f depicts a data structure associated with the process of FIG. 8a after a gathering phase of a transaction. The records 868 and 869 are updated to flip the enable/disable bit to "0" (disable) to preclude access to O and P by A and C, respectively. Additionally, new records 875 and 876 are created to associate entity D with O and P but to preclude access by setting the enable/disable bit to "0". Record 870 is updated to provide a reserve amount of 50 L$, reducing the available balance to 50 L$. Record 871 is unchanged. Record 872 is updated to provide a reserve amount of 3 T, reducing the accessible amount of membership tokens to 0 T for D.

FIG. 8g depicts a data structure associated with the process of FIG. 8a after a delivering phase of a transaction. Records 868 and 869 are unchanged. The records 875 and 876 are updated to flip the enable/disable bit to "1" (enable) to allow access to O and P by A and C, respectively. Record 870 is changed to debit the account balance and the available balance of entity B to 50 L$. Record 871 is changed to credit the account of entity D by 50 L$, resulting in an account balance and an available balance of 125 L$. Record 872 is updated to change the membership balance to 0 T. A new record 873 for A provides a membership balance of 1 T, and a new record 874 for B provides a membership balance of 2 T.

FIG. 9a depicts a process in which an original object at a simulation server is purchased. In this example, a no-copy object is purchased.

As mentioned, a resource such as object data can be stored in different locations, such as at a simulation server or an asset server. The issue of whether or not a copy of an object has been made, and whether a copy of an object is moved to a different location, can be relevant. Generally, one or more databases can be updated to identify the location of a current copy of a resource and to identify one or more users that have access to the resource, such as via a database record which includes the resource ID. The simulation server and asset server may have their own databases (308 and 354 in FIG. 3), in one possible approach. In another possible approach, they can share one or more databases. Further, in some cases, the transaction manager can instruct the simulation server and asset server to update a database. In other cases, the transaction manager can update a database (such as 340 in FIG. 3) without involvement of the simulation server and asset server. In this example, the simulation server and asset server are responsible for maintaining respective databases.

In FIGS. 9a-11, the steps of a transaction which relate to movement of data or updating databases are provided. Other steps involving, e.g., adjusting of accounts for payment, are not depicted, but are analogous to previous examples.

Step 900 includes a first entity requesting a transaction to buy a no-copy object from a second entity, for a price. The object is stored at a simulation server, and the simulation server maintains an association between the object and the second entity in a database. At step 902, the first entity sends a request to the transaction manager via an agent. At step 904, in a gathering phase, the transaction manager instructs a simulation server to update a database to render the object inaccessible to the second entity, while maintaining an association between the object and the second entity. Next, one of two paths is followed.

In one path, at step 906, the transaction manager instructs the simulation server to create an association between the object and the first entity in a database, where the object is inaccessible to first entity. The object remains at the simulation server, such as in cache. At step 908, in a delivery phase, the transaction manager instructs the simulation server to update the database to render the object accessible to the first entity. At step 910, the transaction manager instructs the simulation server to delete the association between the object and the second entity, or the association is left for garbage collection.

In a second path, at step 912, the transaction manager instructs the simulation server to serialize the object data to an asset server. Note that an object is written once to an asset server. If an object is modified on the asset server, it is treated as a new asset and is provided with a new identifier.

At step 914, the transaction manager instructs the asset server to create an association between the object and the first entity in the database, where the object is inaccessible to the first entity. At step 916, in a delivery phase, the transaction manager instructs the asset server to update the database to render the object accessible to the first entity. At step 918, the transaction manager instructs the asset server to delete the association between the object and the second entity, or the association is left for garbage collection.

FIG. 9b depicts a process in which a copy of an object at a simulation server is purchased. In this example, a second copy of an object is purchased. Step 920 includes a first entity requesting a transaction to buy a second copy of an object from a second entity, for a price. A first copy of the object is stored at a simulation server, and the simulation server maintains an association between the first copy of the object and the second entity in a database. At step 922, the first entity sends a request to the transaction manager via an agent. At step 924, in a gathering phase, the transaction manager instructs the simulation server to generate the second copy of the object from the first copy, while maintaining an association between the first copy of the object and the second entity. Next, one of two paths is followed.

In one path, at step 926, the transaction manager instructs the simulation server to create an association between the second copy of the object and the first entity in a database, where the second copy of the object is inaccessible to first entity. The second copy of the object remains at the simulation server, such as in cache. At step 928, in a delivery phase, the transaction manager instructs the simulation server to update the database to render the second copy of the object accessible to the first entity.

In a second path, at step 930, in the gathering phase, the transaction manager instructs the simulation server to serialize the second copy of the object data to an asset server. At step 932, the transaction manager instructs the asset server to create an association between the second copy of the object and the first entity in a database, where the second copy of the object is inaccessible to first entity. At step 934, in a delivery phase, the transaction manager instructs the asset server to update the database to render the second copy of the object accessible to the first entity.

FIG. 10a depicts a process in which an original object at an asset server is purchased. As mentioned, an object may be stored at an asset server when it becomes involved in a transaction. The object may remain at the asset server or be transferred to a simulation server, for instance.

At step 1000, a first entity requests a transaction to buy a no-copy object from a second entity, for a price. The object is stored at an asset server, and the asset server maintains an association between the object and a second entity in a database. At step 1002, the first entity sends a request to the transaction manager via an agent. At step 1004, in the gathering phase, the transaction manager instructs the asset server to update the database to render the object inaccessible to the second entity, while maintaining an association between the object and the second entity.

In a first path, at step 1006, the transaction manager instructs the asset server to create an association between the object and the first entity in the database, where the object is inaccessible to the first entity. The object remains at the asset server. At step 1008, in a delivery phase, the transaction manager instructs the asset server to update the database to render the object accessible to the first entity. The transaction manager instructs the asset server to delete the association between the object and the second entity, or the association is left for garbage collection.

In a second path, at step 1012, the transaction manager instructs the asset server to send serialized object data to a simulation server, in a process referred to as "rezzing." The object may be stored in a serialized form, such as in a file at the asset server. At step 1014, the transaction manager instructs the simulation server to create an association between the object and the first entity in the database, where the object is inaccessible to the first entity. At step 1016, in a delivery phase, the transaction manager instructs the simulation server to update the database to render the object accessible to first entity. At step 1018, the transaction manager instructs the asset server to delete the association between object and the second entity, or the association is left for garbage collection.

FIG. 10b depicts a process in which a copy of an object at an asset server is purchased. At step 1020, a first entity requests a transaction to buy a second copy of an object from a second entity, for a price. The object is stored at an asset server, and the asset server maintains an association between a first copy of the object and the second entity in a database. At step 1022, the first entity sends a request to the transaction manager via an agent. At step 1024, in the gathering phase, the transaction manager instructs the asset server to generate a second copy of the object from the first copy, while maintaining an association between the first copy of the object and the second entity.

In a first path, at step 1026, the transaction manager instructs the asset server to create an association between the second copy of the object and the first entity in the database, where the second copy of the object is inaccessible to the first entity. The second copy of the object remains at the asset server. At step 1028, in a delivery phase, the transaction manager instructs the asset server to update the database to render the second copy of the object accessible to the first entity.

In a second path, at step 1030, the transaction manager instructs the asset server to send a serialized second copy of the object data to a simulation server. At step 1032, the transaction manager instructs the simulation server to create an association between the second copy of the object and the first entity in the database, where the second copy of the object is inaccessible to the first entity. At step 1034, in a delivery phase, the transaction manager instructs the simulation server to update the database to render the second copy of the object accessible to first entity.

FIG. 11 depicts an alternative process in which an original object at an asset server is purchased. In this example, the transaction manager directly updates a database to implement a transaction.

At step 1100, a first entity requests a transaction to buy a no-copy object from a second entity, for a price. The object is stored at an asset server. The transaction manager maintains an association between the object and the second entity in a database. At step 1102, the first entity sends a request to the transaction manager via agent. At step 1104, in a gathering phase, the transaction manager updates the database to render the object inaccessible to the second entity, while maintaining an association between the object and the second entity. At step 1106, the transaction manager creates an association between the object and the first entity in database, where the object is inaccessible to the first entity. The object remains at the asset server. At step 1008, in a delivery phase, the transaction manager updates the database to render the object accessible to the first entity. At step 1110, the transaction manager deletes the association between the object and the second entity, or the association is left for garbage collection.

The foregoing detailed description has been presented for purposes of illustration and description. It is not intended to be exhaustive or to limit the invention to the precise form disclosed. Many modifications and variations are possible in light of the above teaching. The described embodiments were chosen to best explain the principles and its practical application, to thereby enable others skilled in the art to best utilize the invention in various embodiments and with various modifications as are suited to the particular use contemplated. It is intended that the scope be defined by the claims appended hereto.

What is claimed is:

1. A system, comprising:
   a plurality of asset servers managing backup storage of virtual objects of a virtual world, the virtual world including a shared virtual environment in which users can interact with one another through an avatar;
   a VPN network or a secure Internet connection including a HyperText Transfer Protocol (HTTP), Secure Sockets Layer (SSL), Advanced Messaging Query Protocol (AMQP), an open Internet Protocol for Business Messaging, or Certified HTTP (CHTTP), or any combination thereof; and
   a plurality of simulation servers in communication with the plurality of asset servers via the VPN network or the secure Internet connection, the plurality of simulation servers loading portions of the virtual objects from the asset servers to generate view simulations of the virtual world having the virtual objects, wherein the plurality of simulation servers store the virtual objects in cache memory, wherein the simulation servers communicate with client hosts via the VPN network or the secure Internet connection to provide the view simulations for electronic display on the client hosts, including:
- a first simulation server in communication with a first client host of a first user via the VPN network or the secure Internet connection, the first simulation server generating a first view simulation of the virtual world for electronic display on the first client host; and
- a second simulation server in communication via the VPN network or the secure Internet connection with a second client host of a second user, the second simulation server generating a second view simulation of the virtual world for electronic display on the second client host;

wherein, in response to a request from the first client host of the first user identifying a virtual object controlled by the second user of the virtual world, the system:
- updates a first database record of the second user, causing the second simulation server in communication with the second client host used by the second user to hide the virtual object from the second view simulation of the virtual world while maintaining association between the virtual object and the second user;
- transfers the virtual object from the second simulation server to a first asset server, the first asset server having a mirrored hard drive backup while maintaining association between the virtual object and the second user;
- generates a second database record of the first user to identify the virtual object and creates an association of the virtual object with the first user, wherein the second database record is generated to include an indicator that prevents the virtual object from being loaded into the first simulation server that is in communication with the first client host and maintains the virtual object hidden from the first user; and
- removes the indicator from the second database record, causing the first simulation server to load the virtual object from the first asset server, render the virtual object in the first view and delete the association between the virtual object and the second user, wherein if the transferring, the generating, or the removing is unsuccessful, the system updates the first database record of the second user, causing the second simulation server in communication with the second client host used by the second user to load the virtual object from the second view simulation of the virtual world and deletes the virtual object from the first asset server.

2. The system of claim 1, wherein the virtual object is a copy of an object.

3. The system of claim 1, wherein the virtual object is an original object.

4. The system of claim 1, comprising a transaction manager.

5. The system of claim 1, wherein the system updating the first database record of the second user, causing the second simulation server in communication with the second client host used by the second user to hide the virtual object from the second view simulation of the virtual world displayed on the second client host comprises setting a flag bit in the first database record of the second user to a second value.

6. The system of claim 1, wherein the system removing the indicator from the second database record, comprises flipping a flag bit of the second database record from a first value to a second value.

7. The system of claim 1, wherein the system verifies that the virtual object is controlled by the second user of the virtual world.

8. The system of claim 1, comprising, after providing control of the virtual object to the first user, and removing the indicator from the second database record, causing the first simulation server to load the virtual object from the first asset server and render the virtual object in the first view simulation of the virtual world displayed on the first client host, the system deletes the first database record of the second user.

* * * * *